(12) United States Patent
Cai et al.

(10) Patent No.: US 12,020,620 B2
(45) Date of Patent: Jun. 25, 2024

(54) DISPLAY METHOD, ELECTRONIC DEVICE, AND COMPUTER STORAGE MEDIUM

(71) Applicant: Honor Device Co., Ltd., Guangdong (CN)

(72) Inventors: Lifeng Cai, Shenzhen (CN); Hongyan Du, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/249,625

(22) PCT Filed: Jan. 11, 2022

(86) PCT No.: PCT/CN2022/071281
§ 371 (c)(1),
(2) Date: Apr. 19, 2023

(87) PCT Pub. No.: WO2022/257451
PCT Pub. Date: Dec. 15, 2022

(65) Prior Publication Data
US 2023/0386382 A1    Nov. 30, 2023

(30) Foreign Application Priority Data
Jun. 10, 2021  (CN) .......................... 202110650483.X

(51) Int. Cl.
*G09G 3/20* (2006.01)
*G06F 3/041* (2006.01)

(52) U.S. Cl.
CPC ........... *G09G 3/20* (2013.01); *G06F 3/04166* (2019.05); *G09G 2320/0247* (2013.01);
(Continued)

(58) Field of Classification Search
CPC ................. G09G 3/20; G09G 3/04166; G09G 2320/0247; G09G 2320/0606;
(Continued)

(56) References Cited

U.S. PATENT DOCUMENTS

| 8,207,977 B1 * | 6/2012 | Kumar .................... G09G 5/36 345/519 |
| 10,339,987 B2 | 7/2019 | Zheng |

(Continued)

FOREIGN PATENT DOCUMENTS

| CN | 101206580 A | 6/2008 |
| CN | 103677538 A | 3/2014 |

(Continued)

*Primary Examiner* — Christopher E Leiby
(74) *Attorney, Agent, or Firm* — Rimon PC

(57) ABSTRACT

Embodiments of this application disclose a display method, an electronic device, and a computer storage medium. The method includes: An electronic device obtains a first parameter, where the first parameter includes ambient light brightness and/or screen brightness. The electronic device determines, based on the first parameter, whether to enable a software scanning rate adjustment function, where the software scanning rate adjustment function is a function of separately adjusting a software scanning rate and a hardware scanning rate. The electronic device receives a first operation, where the first operation is a touch operation received by the electronic device when the software scanning rate adjustment function is enabled.

14 Claims, 33 Drawing Sheets

(52) U.S. Cl.
CPC ............... *G09G 2330/021* (2013.01); *G09G 2340/0435* (2013.01); *G09G 2354/00* (2013.01); *G09G 2360/144* (2013.01)

(58) Field of Classification Search
CPC ..... G09G 2330/021; G09G 2340/0435; G09G 2354/00; G09G 2360/144; G09G 5/30; G06F 9/44505; G06F 9/451; G06F 3/147; G06F 3/0488; G06F 3/04883; G06F 3/04897; G06F 3/04847; G06F 3/0484
See application file for complete search history.

(56) References Cited

U.S. PATENT DOCUMENTS

| | | | |
|---|---|---|---|
| 10,768,947 | B2 | 9/2020 | Zeng |
| 2010/0332981 | A1 | 12/2010 | Lipton et al. |
| 2014/0035835 | A1 | 2/2014 | Ming et al. |
| 2017/0344219 | A1 | 11/2017 | Nielsen |
| 2018/0018795 | A1 | 1/2018 | Li |
| 2018/0261190 | A1 | 9/2018 | Yi et al. |
| 2019/0378564 | A1 | 12/2019 | Chang |
| 2022/0193340 | A1* | 6/2022 | Patel ................. A61M 5/14244 |
| 2022/0343820 | A1* | 10/2022 | Wen ....................... G06F 3/0484 |
| 2023/0178050 | A1* | 6/2023 | Lee ........................ G06F 3/041 |
| | | | 345/213 |
| 2023/0297190 | A1* | 9/2023 | Gao .................... G06F 3/04184 |

FOREIGN PATENT DOCUMENTS

| | | |
|---|---|---|
| CN | 105094272 A | 11/2015 |
| CN | 106095417 A | 11/2016 |
| CN | 106875925 A | 6/2017 |
| CN | 108243349 A | 7/2018 |
| CN | 108762652 A | 11/2018 |
| CN | 109147714 A | 1/2019 |
| CN | 110134319 A | 8/2019 |
| CN | 110377251 A | 10/2019 |
| CN | 110619860 A | 12/2019 |
| CN | 111610848 A | 9/2020 |
| CN | 111782458 A | 10/2020 |
| CN | 112256219 A | 1/2021 |
| CN | 112269702 A | 1/2021 |
| CN | 112667340 A | 4/2021 |
| CN | 113722030 A | 11/2021 |

* cited by examiner

DISPLAY METHOD, ELECTRONIC DEVICE, AND COMPUTER STORAGE MEDIUM

CROSS-REFERENCE TO RELATED APPLICATIONS

This application is a national stage of International Application No. PCT/CN2022/071281, filed on Jan. 11, 2022, which claims priority to Chinese Patent Application No. 202110650483.X, filed on Jun. 10, 2021. The disclosures of both of the aforementioned applications are hereby incorporated by reference in their entireties.

TECHNICAL FIELD

This application relates to the field of terminal display technologies, and in particular, to a display method, an electronic device, and a computer storage medium.

BACKGROUND

To pursue a smoother picture and improve viewing experience of a user, a display scanning rate that can be supported by an electronic device continuously increases. For example, the electronic device may support a higher scanning rate by using a liquid crystal display (liquid crystal display, LCD) or an organic light-emitting diode (organic light-emitting diode, OLED). However, as the scanning rate increases, power consumption of the electronic device increases. Currently, user experience and power consumption of the electronic device are considered by performing switching between scanning rates.

For example, when the user views text content by using the electronic device, the electronic device may work in an environment with a relatively low scanning rate. When the user plays a game by using the electronic device, the electronic device may work in an environment with a relatively high scanning rate. However, when switching is performed between different scanning rates, the user obviously feels a change of screen brightness of the electronic device.

SUMMARY

This application provides a display method, an electronic device, and a computer storage medium, to avoid a screen flash.

According to a first aspect, this application provides a display method, including: An electronic device obtains a first parameter, where the first parameter includes ambient light brightness and/or screen brightness. The electronic device determines, based on the first parameter, whether to enable a software scanning rate adjustment function, where the software scanning rate adjustment function is a function of separately adjusting a software scanning rate and a hardware scanning rate. The electronic device receives a first operation, where the first operation is a touch operation received by the electronic device when the software scanning rate adjustment function is enabled. The electronic device adjusts the hardware scanning rate and/or the software scanning rate based on the first operation and a current hardware scanning rate and/or a software scanning rate. If the software scanning rate is a high scanning rate, the electronic device switches the software scanning rate from a high scanning rate to a low scanning rate when the electronic device does not detect a touch operation within first duration.

The first operation may be an operation of touching (for example, tapping or sliding) a screen by a user, may be an operation of starting or switching an application, or may be an operation of setting a scanning rate of the screen. A high scanning rate and a low scanning rate are relative, and a high scanning rate is higher than a low scanning rate corresponding to the high scanning rate. That the electronic device switches the hardware scanning rate from a low scanning rate to a high scanning rate may be understood as that the electronic device switches (increases) the hardware scanning rate to a high scanning rate. That the electronic device switches the hardware scanning rate from a high scanning rate to a low scanning rate may be understood as that the electronic device switches (reduces) the hardware scanning rate to a low scanning rate. Switching of the software scanning rate is similar. Details are not described.

In embodiments of this application, when the software scanning rate adjustment function is enabled, the electronic device may switch the hardware scanning rate to a high scanning rate in advance. Then, when scanning rate switching needs to be performed, the electronic device may directly switch the software scanning rate. Therefore, a quantity of times of switching of the hardware scanning rate can be reduced, a quantity of flashes of the electronic device can be reduced, and user experience can be improved. In addition, when the electronic device does not enable the software scanning rate adjustment function, both the hardware scanning rate and the software scanning rate may be switched. When the software scanning rate adjustment function is enabled, the software scanning rate may be switched instead of keeping a relatively high scanning rate. Therefore, the electronic device can reduce power consumption and save energy while improving user experience.

In a possible implementation, that the electronic device determines, based on the first parameter, whether to enable a software scanning rate adjustment function includes: When detecting that the ambient light brightness is less than or equal to a first threshold, and/or when detecting that the screen brightness is less than or equal to a second threshold, the electronic device determines to enable the software scanning rate adjustment function.

In embodiments of this application, the electronic device may determine, based on an ambient light condition and a screen brightness condition, whether light in which the electronic device is located is relatively dark, and/or whether screen brightness is relatively dark. This helps the electronic device enable the software scanning rate adjustment function for different ambient light conditions and/or screen brightness, and reduce a quantity of screen flashes caused because the hardware scanning rate is switched due to dark ambient light and/or dark screen brightness.

In a possible implementation, when the first operation is a first operation that is first received after the software scanning rate adjustment function is enabled, that the electronic device adjusts the hardware scanning rate and/or the software scanning rate based on the first operation and a current hardware scanning rate and/or a software scanning rate includes: When a hardware scanning rate used before the software scanning rate adjustment function is enabled is a low scanning rate, the electronic device switches the hardware scanning rate from a low scanning rate to a high scanning rate in response to the first operation.

In embodiments of this application, when the hardware scanning rate used before the software scanning rate adjustment function is enabled is a low scanning rate, and the electronic device detects the touch operation of the user for the first time after the software scanning rate adjustment function is enabled, the electronic device may switch the hardware scanning rate to a high scanning rate. In this way, all scanning rates on which switching is performed after the software scanning rate adjustment function is enabled may be met by switching the software scanning rate. This reduces a quantity of times of switching of the hardware scanning rate, reduces a quantity of screen flashes, and improves user experience.

In a possible implementation, the first operation is an operation of starting or switching an application, the electronic device includes a plurality of applications and scanning rates separately corresponding to the plurality of applications, and that the electronic device adjusts the hardware scanning rate and/or the software scanning rate based on the first operation and a current hardware scanning rate and/or a software scanning rate includes: When the first operation is performed on an application with a low scanning rate, the current hardware scanning rate is a high scanning rate, and the software scanning rate is a high scanning rate, the electronic device switches the software scanning rate from a high scanning rate to a low scanning rate in response to the first operation.

In embodiments of this application, after the electronic device enables the software scanning rate adjustment function, when the electronic device receives the operation of starting or switching an application by the user, the electronic device may adjust the scanning rate by switching the software scanning rate. This can avoid a screen flash, and improve user experience.

In a possible implementation, the first operation is an operation of starting or switching an application, the electronic device includes a plurality of applications and scanning rates separately corresponding to the plurality of applications, and that the electronic device adjusts the hardware scanning rate and/or the software scanning rate based on the first operation and a current hardware scanning rate and/or a software scanning rate includes: When the first operation is performed on an application with a high scanning rate, the current hardware scanning rate is a high scanning rate, and the software scanning rate is a low scanning rate, the electronic device switches the software scanning rate from a low scanning rate to a high scanning rate in response to the first operation.

In embodiments of this application, after the electronic device enables the software scanning rate adjustment function, when the electronic device receives the operation of starting or switching an application by the user, the electronic device may adjust the scanning rate by switching the software scanning rate. This can avoid a screen flash, and improve user experience.

In a possible implementation, the first operation is an operation of setting a screen scanning rate to a high scanning rate, and that the electronic device adjusts the hardware scanning rate and/or the software scanning rate based on the first operation and a current hardware scanning rate and/or a software scanning rate includes: When the current hardware scanning rate is a high scanning rate, and the software scanning rate is a low scanning rate, the electronic device switches the software scanning rate from a low scanning rate to a high scanning rate in response to the first operation.

In embodiments of this application, when the electronic device receives the operation of setting a scanning rate, the electronic device may adjust the scanning rate by switching the software scanning rate, so that a screen flash can be avoided, and user experience can be improved.

In a possible implementation, the first operation is an operation of setting the screen scanning rate to a low scanning rate, and that the electronic device adjusts the hardware scanning rate and/or the software scanning rate based on the first operation and a current hardware scanning rate and/or a software scanning rate includes: When the current hardware scanning rate is a high scanning rate, and the software scanning rate is a high scanning rate, the electronic device switches the software scanning rate from a high scanning rate to a low scanning rate in response to the first operation.

In embodiments of this application, when the electronic device receives the operation of setting a scanning rate, the electronic device may adjust the scanning rate by switching the software scanning rate, so that a screen flash can be avoided, and user experience can be improved.

In a possible implementation, if the software scanning rate is a high scanning rate, after the switching the software scanning rate from a high scanning rate to a low scanning rate when the electronic device does not detect a touch operation within first duration, the method further includes: The electronic device receives a second operation when the software scanning rate adjustment function is enabled, where the second operation is not a first touch operation. The electronic device switches the software scanning rate from a low scanning rate to a high scanning rate based on the second operation.

In embodiments of this application, after the electronic device enables the software scanning rate adjustment function, the electronic device may switch the software scanning rate to a high scanning rate based on a user operation. When no touch operation is received within a period of time, the software scanning rate may be reduced, or when a touch operation is received again, the software scanning rate may be increased. In the foregoing touch operation process of the user, the electronic device may adjust only the software scanning rate to implement scanning rate switching, so that a quantity of screen flashes can be reduced, and power consumption can be reduced.

In a possible implementation, when the first operation is a first touch operation in a specific condition, that the electronic device switches the hardware scanning rate to a high scanning rate includes: When the first operation is the first touch operation in the specific condition, and a quantity of times of switching of the hardware scanning rate within second duration is less than a third threshold, the electronic device switches the hardware scanning rate to a high scanning rate.

In embodiments of this application, when the software scanning rate adjustment function is enabled, if the hardware scanning rate is frequently switched, the user obviously feels frequent screen flashes. Therefore, a quantity of times of switching of the hardware scanning rate may be limited within a specific period of time, so that a quantity of screen flashes can be reduced, and user experience can be improved.

In a possible implementation, a software scanning rate obtained after switching is 1/N of the hardware scanning rate, and N is a positive integer.

According to a second aspect, this application provides an electronic device, including a display, one or more processors, and one or more memories. The processor is configured to obtain a first parameter, where the first parameter includes ambient light brightness and/or screen brightness. The processor is further configured to determine, based on the first parameter, whether to enable a software scanning rate adjustment function, where the software scanning rate adjustment function is a function of separately adjusting a software scanning rate and a hardware scanning rate. The processor is further configured to receive a first operation, where the first operation is a touch operation received by the electronic device when the software scanning rate adjustment function is enabled. The processor is further configured to adjust the hardware scanning rate and/or the software scanning rate based on the first operation and a current hardware scanning rate and/or a software scanning rate. The processor is further configured to: if the software scanning rate is a high scanning rate, switch the software scanning rate from a high scanning rate to a low scanning rate when the electronic device does not detect a touch operation within first duration.

The first operation may be an operation of touching (for example, tapping or sliding) a screen by a user, may be an operation of starting or switching an application, or may be an operation of setting a scanning rate of the screen. A high scanning rate and a low scanning rate are relative, and a high scanning rate is higher than a low scanning rate corresponding to the high scanning rate. That the electronic device switches the hardware scanning rate from a low scanning rate to a high scanning rate may be understood as that the electronic device switches (increases) the hardware scanning rate to a high scanning rate. That the electronic device switches the hardware scanning rate from a high scanning rate to a low scanning rate may be understood as that the electronic device switches (reduces) the hardware scanning rate to a low scanning rate. Switching of the software scanning rate is similar. Details are not described.

In embodiments of this application, when the software scanning rate adjustment function is enabled, the electronic device may switch the hardware scanning rate to a high scanning rate in advance. Then, when scanning rate switching needs to be performed, the electronic device may directly switch the software scanning rate. Therefore, a quantity of times of switching of the hardware scanning rate can be reduced, a quantity of flashes of the electronic device can be reduced, and user experience can be improved. In addition, when the electronic device does not enable the software scanning rate adjustment function, both the hardware scanning rate and the software scanning rate may be switched. When the software scanning rate adjustment function is enabled, the software scanning rate may be switched instead of keeping a relatively high scanning rate. Therefore, the electronic device can reduce power consumption and save energy while improving user experience.

In a possible implementation, that the processor determines, based on the first parameter, whether to enable a software scanning rate adjustment function includes: When detecting that the ambient light brightness is less than or equal to a first threshold, and/or when detecting that the screen brightness is less than or equal to a second threshold, the processor determines to enable the software scanning rate adjustment function.

In embodiments of this application, the electronic device may determine, based on an ambient light condition and a screen brightness condition, whether light in which the electronic device is located is relatively dark, and/or whether screen brightness is relatively dark. This helps the electronic device enable the software scanning rate adjustment function for different ambient light conditions and/or screen brightness, and reduce a quantity of screen flashes caused because the hardware scanning rate is switched due to dark ambient light and/or dark screen brightness.

In a possible implementation, when the first operation is a first operation that is first received after the software scanning rate adjustment function is enabled, that the processor adjusts the hardware scanning rate and/or the software scanning rate based on the first operation and a current hardware scanning rate and/or a software scanning rate includes: When a hardware scanning rate used before the software scanning rate adjustment function is enabled is a low scanning rate, the processor switches the hardware scanning rate from a low scanning rate to a high scanning rate in response to the first operation.

In embodiments of this application, when the hardware scanning rate used before the software scanning rate adjustment function is enabled is a low scanning rate, and the electronic device detects the touch operation of the user for the first time after the software scanning rate adjustment function is enabled, the electronic device may switch the hardware scanning rate to a high scanning rate. In this way, all scanning rates on which switching is performed after the software scanning rate adjustment function is enabled may be met by switching the software scanning rate. This reduces a quantity of times of switching of the hardware scanning rate, reduces a quantity of screen flashes, and improves user experience.

In a possible implementation, the first operation is an operation of starting or switching an application, the electronic device includes a plurality of applications and scanning rates separately corresponding to the plurality of applications, and that the processor adjusts the hardware scanning rate and/or the software scanning rate based on the first operation and a current hardware scanning rate and/or a software scanning rate includes: When the first operation is performed on an application with a low scanning rate, the current hardware scanning rate is a high scanning rate, and the software scanning rate is a high scanning rate, the processor switches the software scanning rate from a high scanning rate to a low scanning rate in response to the first operation.

In embodiments of this application, after the electronic device enables the software scanning rate adjustment function, when the electronic device receives the operation of starting or switching an application by the user, the electronic device may adjust the scanning rate by switching the software scanning rate. This can avoid a screen flash, and improve user experience.

In a possible implementation, the first operation is an operation of starting or switching an application, the electronic device includes a plurality of applications and scanning rates separately corresponding to the plurality of applications, and that the processor adjusts the hardware scanning rate and/or the software scanning rate based on the first operation and a current hardware scanning rate and/or a software scanning rate includes: When the first operation is performed on an application with a high scanning rate, the current hardware scanning rate is a high scanning rate, and the software scanning rate is a low scanning rate, the processor switches the software scanning rate from a low scanning rate to a high scanning rate in response to the first operation.

In embodiments of this application, after the electronic device enables the software scanning rate adjustment function, when the electronic device receives the operation of starting or switching an application by the user, the electronic device may adjust the scanning rate by switching the software scanning rate. This can avoid a screen flash, and improve user experience.

In a possible implementation, the first operation is an operation of setting a screen scanning rate to a high scanning rate, and that the processor adjusts the hardware scanning rate and/or the software scanning rate based on the first operation and a current hardware scanning rate and/or a software scanning rate includes: When the current hardware scanning rate is a high scanning rate, and the software scanning rate is a low scanning rate, the processor switches the software scanning rate from a low scanning rate to a high scanning rate in response to the first operation.

In embodiments of this application, when the electronic device receives the operation of setting a scanning rate, the electronic device may adjust the scanning rate by switching the software scanning rate, so that a screen flash can be avoided, and user experience can be improved.

In a possible implementation, the first operation is an operation of setting the screen scanning rate to a low scanning rate, and that the processor adjusts the hardware scanning rate and/or the software scanning rate based on the first operation and a current hardware scanning rate and/or a software scanning rate includes: When the current hardware scanning rate is a high scanning rate, and the software scanning rate is a high scanning rate, the processor switches the software scanning rate from a high scanning rate to a low scanning rate in response to the first operation.

In embodiments of this application, when the electronic device receives the operation of setting a scanning rate, the electronic device may adjust the scanning rate by switching the software scanning rate, so that a screen flash can be avoided, and user experience can be improved.

In a possible implementation, if the software scanning rate is a high scanning rate, after the processor switches the software scanning rate from a high scanning rate to a low scanning rate when the processor does not detect a touch operation within first duration, the processor is further configured to receive a second operation when the software scanning rate adjustment function is enabled, where the second operation is not a first touch operation. The processor is further configured to switch the software scanning rate from a low scanning rate to a high scanning rate based on the second operation.

In embodiments of this application, when the electronic device receives the operation of setting a scanning rate, the electronic device may adjust the scanning rate by switching the software scanning rate, so that a screen flash can be avoided, and user experience can be improved.

In a possible implementation, when the first operation is a first touch operation in a specific condition, that the processor switches the hardware scanning rate to a high scanning rate includes: When the first operation is the first touch operation in the specific condition, and a quantity of times of switching of the hardware scanning rate within second duration is less than a third threshold, the processor switches the hardware scanning rate to a high scanning rate.

In embodiments of this application, when the software scanning rate adjustment function is enabled, if the hardware scanning rate is frequently switched, the user obviously feels frequent screen flashes. Therefore, a quantity of times of switching of the hardware scanning rate may be limited within a specific period of time, so that a quantity of screen flashes can be reduced, and user experience can be improved.

In a possible implementation, a software scanning rate obtained after switching is 1/N of the hardware scanning rate, and N is a positive integer.

According to a third aspect, this application provides an electronic device, including one or more function modules. The one or more function modules are configured to perform the display method in any one of the possible implementations of the foregoing aspect.

According to a fourth aspect, an embodiment of this application provides a computer storage medium, including computer instructions. When the computer instructions are run on an electronic device, the communications apparatus is enabled to perform the display method in any one of the foregoing possible implementations of the foregoing aspect.

According to a fifth aspect, an embodiment of this application provides a computer program product. When the computer program product is run on a computer, the computer is enabled to perform the display method in any one of the possible implementations of the foregoing aspect.

DESCRIPTION OF EMBODIMENTS

The following describes technical solutions in embodiments of this application with reference to the accompanying drawings. In the descriptions of embodiments of this application, unless otherwise specified, "I" represents "or". For example, AB may represent A or B. In this specification, "and/or" is merely an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms such as "first" and "second" are merely used for purposes of description, but are not understood as implying relative importance or implying a quantity of indicated technical features. Therefore, features defined by "first" and "second" may explicitly or implicitly include one or more of the features. In the descriptions of embodiments of this application, unless otherwise specified, "a plurality of" means two or more.

First, with reference to the accompanying drawings, some concepts related to display of an electronic device in embodiments of this application are described, including a vertical scanning (vertical scanning, Vsync) mechanism, a hardware scanning rate, a software scanning rate, and a Gamma Gamma curve.

(1) Vertical Scanning Mechanism

Figure 1:
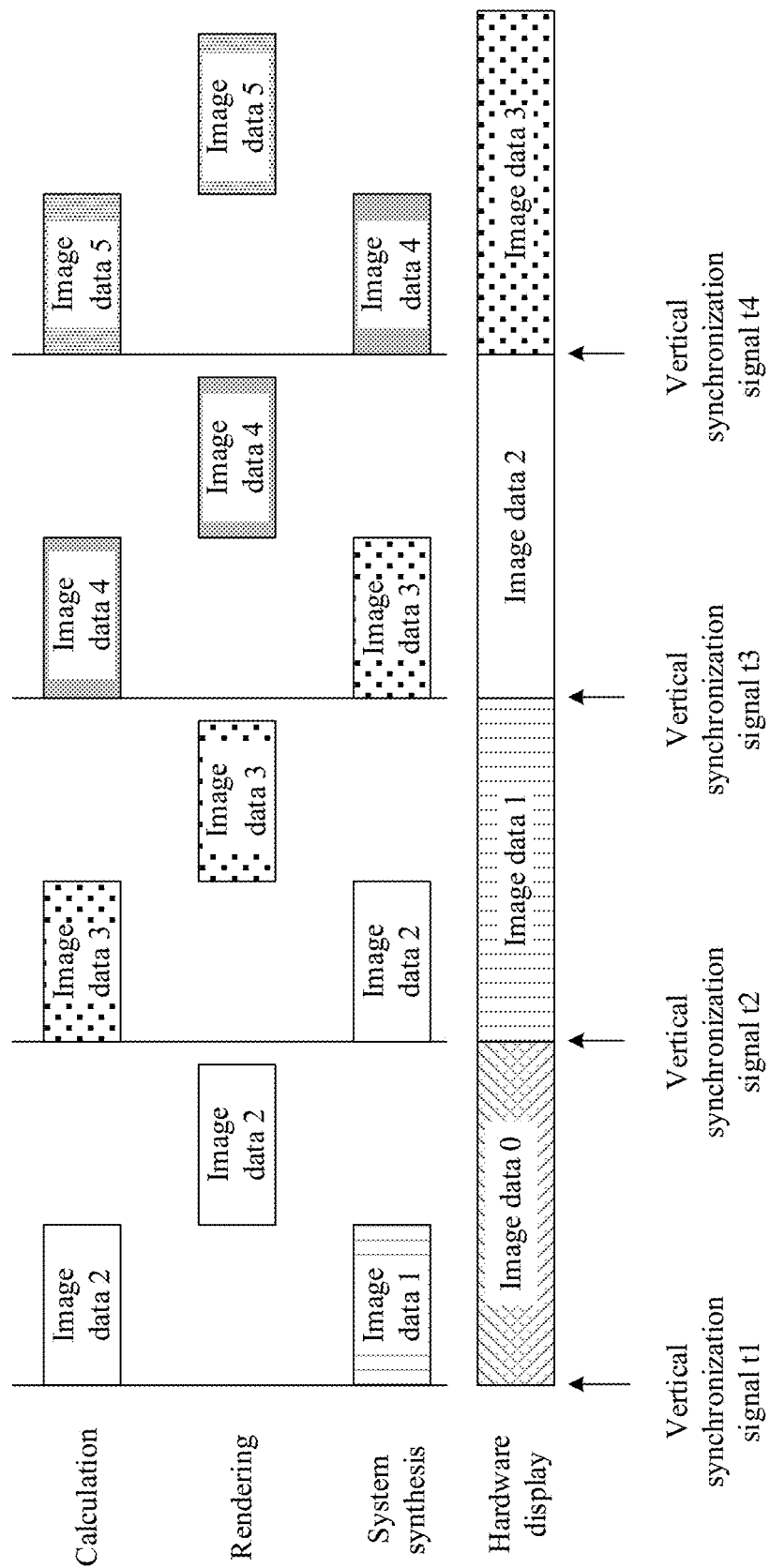
FIG. 1 is a schematic diagram of an image display procedure according to an embodiment of this application.

The vertical scanning (vertical scanning, Vsync) mechanism is a top-to-bottom scanning mechanism. In the vertical scanning mechanism, an electronic device may periodically generate a vertical synchronization signal. That is, a display driver of the electronic device generates one vertical synchronization signal at a same time interval. The vertical synchronization signal may trigger the electronic device to calculate, render, and synthesize image data. Specifically, after receiving the vertical synchronization signal, a processor (for example, a central processing unit (central processing unit, CPU) and a graphics processing unit (graphics processing unit, GPU)) of the electronic device may calculate and render the image data. After receiving the vertical synchronization signal, an image synthesizer (SurfaceFlinger) of the electronic device may perform system synthesis on image data obtained through rendering. After receiving the vertical synchronization signal, a display of the electronic device may display image data obtained after the system synthesis. The electronic device may sequentially perform rendering, system synthesis, and display on the image data based on the "rhythm" of the vertical synchronization signal, but the rendering, the system synthesis, and the display are different. In a periodicity of one vertical synchronization signal, the electronic device performs one-time rendering, one-time system synthesis, and one-time display on the image data. For example, as shown in FIG. 1, in periodicities of four adjacent vertical synchronization signals, an image processing and display process is performed. In a periodicity of a vertical synchronization signal t2, the CPU of the electronic device may calculate image data 3, the GPU of the electronic device may render the image data 3, the SurfaceFlinger of the electronic device may perform system synthesis on image data 2 obtained through rendering in a periodicity of a vertical synchronization signal t1, and the display of the electronic device may display image data 1 obtained through system synthesis in the periodicity of the vertical synchronization signal t1. A process of processing and displaying one piece of image data needs to be completed in periodicities of a plurality of vertical synchronization signals. For example, the image data 2 is calculated and rendered in the periodicity of the vertical synchronization signal t1, system synthesis is performed on the image data 2 in the periodicity of the vertical synchronization signal t2, and the image data 2 is displayed in the periodicity of a vertical synchronization signal t3.

(2) Hardware Scanning Rate and Software Scanning Rate

Display scanning of an electronic device may have two scanning rates. One is a software scanning rate, that is, a frame rate, which is an actual working frequency of a system synthesizer and a system application. The other is a hardware scanning rate, which is usually a scanning rate of a display (screen).

(3) Gamma Gamma Curve

Figure 2A:
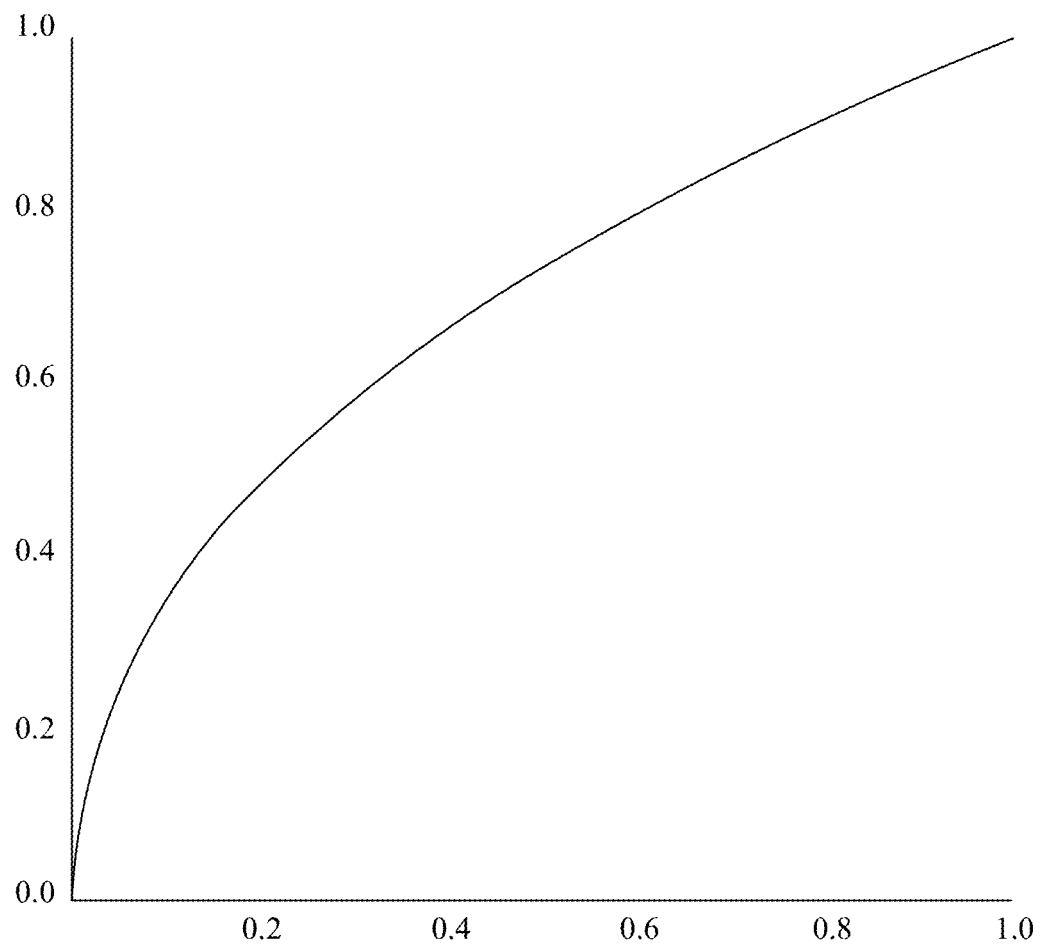
FIG. 2a is a schematic diagram of a change curve of brightness perceived by a human eye in different ambient brightness according to an embodiment of this application.

FIG. 2a shows a change curve of brightness perceived by a human eye in different ambient brightness. The curve in FIG. 2a is similar to a Gamma curve. The Gamma curve is a curve of $y=x^{Gamma}$. A Gamma value is less than 1, a horizontal coordinate x represents brightness naturally incident to a human eye, and a vertical coordinate y represents brightness perceived by a human. It can be learned from FIG. 2a that the brightness naturally incident to the human eye changes nonlinearly with the brightness perceived by the human. When the natural brightness is relatively dark (the brightness incident to the human eye is relatively small), a small brightness increase results in a significant increase in the perceived brightness. When the natural brightness reaches a specific value, a brightness change perceived by the human gradually decreases.

In a display process of the electronic device, an input voltage of the display is linearly related to output brightness of the screen. Therefore, a curve relationship between the input voltage of the electronic device and the brightness perceived by the human is similar to the Gamma curve (convex) whose Gamma value is less than 1. To enable the perceived brightness to be in a linear relationship with the input voltage of the display, that is, with a Gamma value of 1, the display of the electronic device may correct a mapping relationship between the input voltage and the output brightness, that is, by using a Gamma curve whose Gamma value is greater than 1. After the correction, the input voltage of the display of the electronic device can be in a linear relationship with the perceived brightness.

Figure 2B:
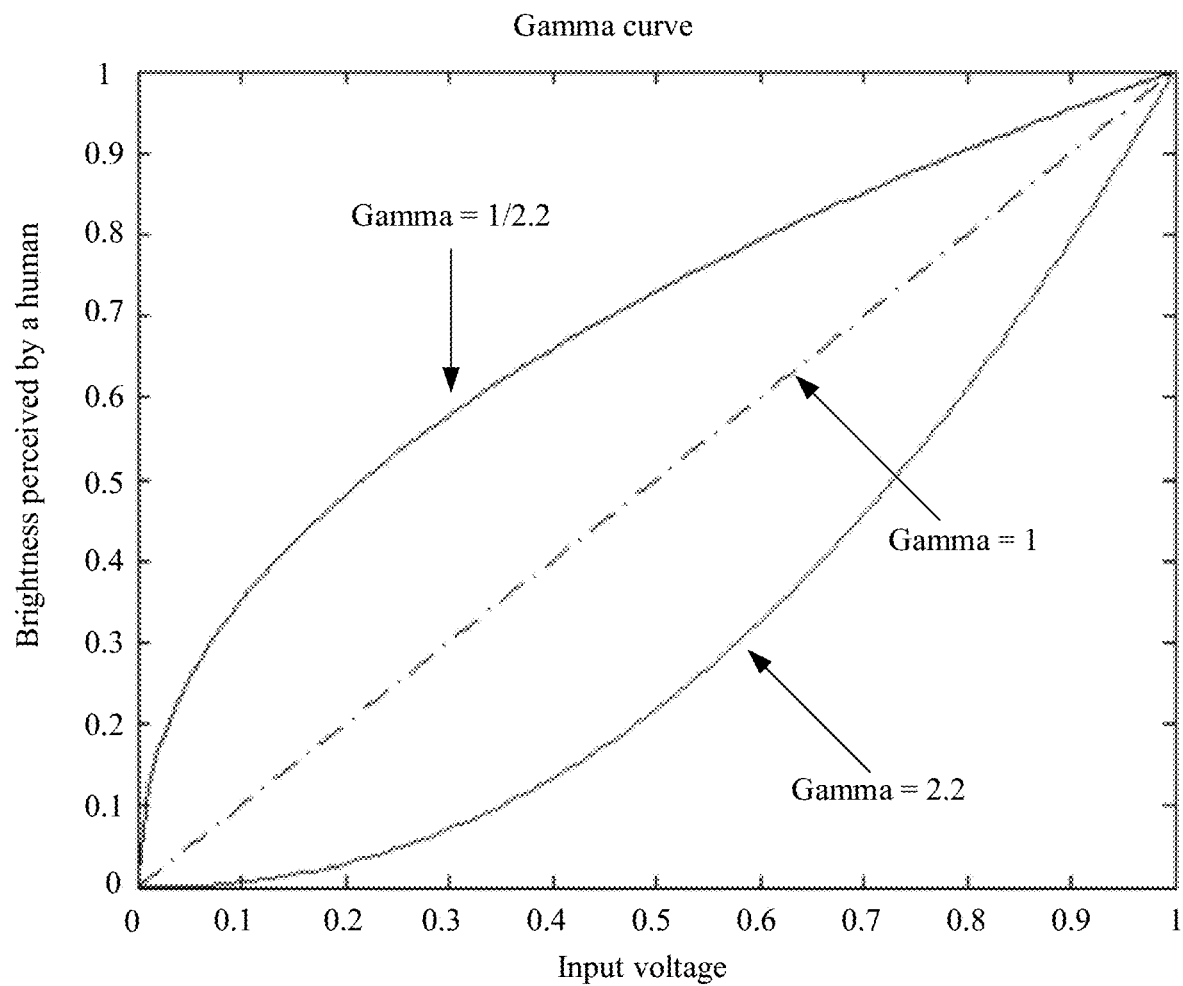
FIG. 2b is a schematic diagram of a Gamma Gamma curve according to an embodiment of this application.

FIG. 2b is a schematic diagram of a Gamma curve according to an embodiment of this application. As shown in FIG. 2b, a horizontal coordinate of the Gamma curve is an input voltage of a display of an electronic device, and a vertical coordinate of the Gamma curve is brightness perceived by a human. It is assumed that the Gamma curve between the input voltage of the electronic device and the brightness perceived by the human is a curve whose Gamma value is 1/2.2. In this case, after correction is performed by using a Gamma curve whose Gamma value is 2.2, the Gamma curve between the input voltage of the electronic device and the brightness perceived by the human is similar to a straight line whose Gamma value is 1.

The following describes an application scenario in embodiments of this application.

The following describes some scenarios of adjusting a screen scanning rate.

Scenario 1: The electronic device may adjust a hardware scanning rate based on a user setting.

A user actively sets switching of the screen scanning rate. When detecting a touch operation on a control used to switch a scanning rate, the electronic device may switch the scanning rate. The user may select a higher scanning rate or a lower scanning rate by using the control on the screen. In response to an operation of switching the scanning rate by the user, the electronic device may switch the hardware scanning rate of the screen, so that the scanning rate can be switched.

FIG. 3(a) to FIG. 3(e) are a schematic diagram of a group of interfaces.

Figure 3A:
FIG. 3(a) to FIG. 3(e) are a schematic diagram of a group of interfaces according to an embodiment of this application.
Figure 3B:
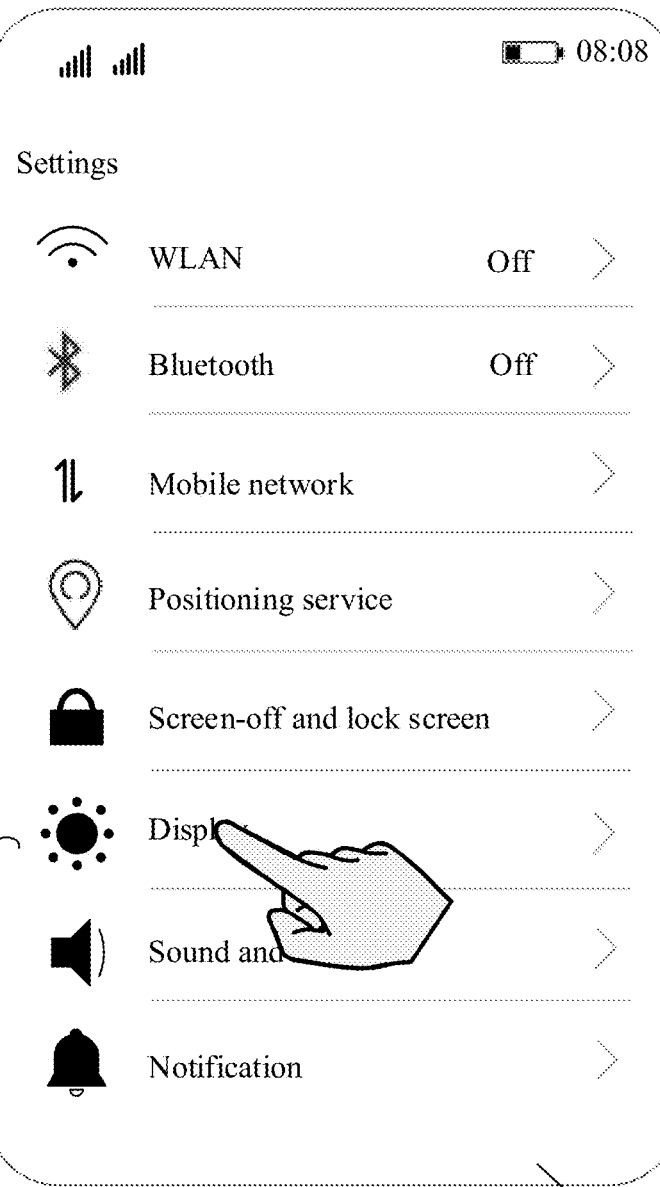
Figure 3C:
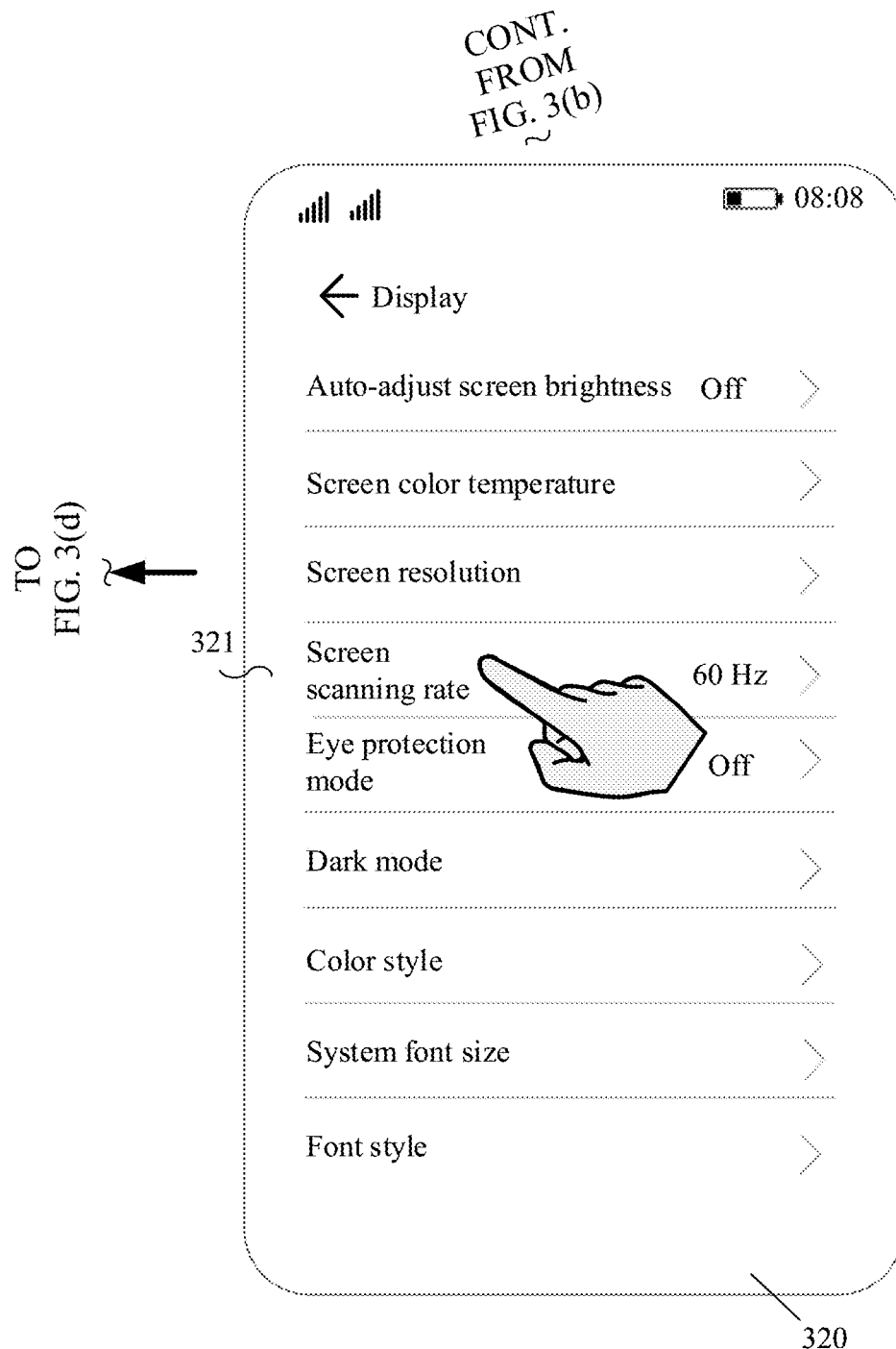
Figure 3D:
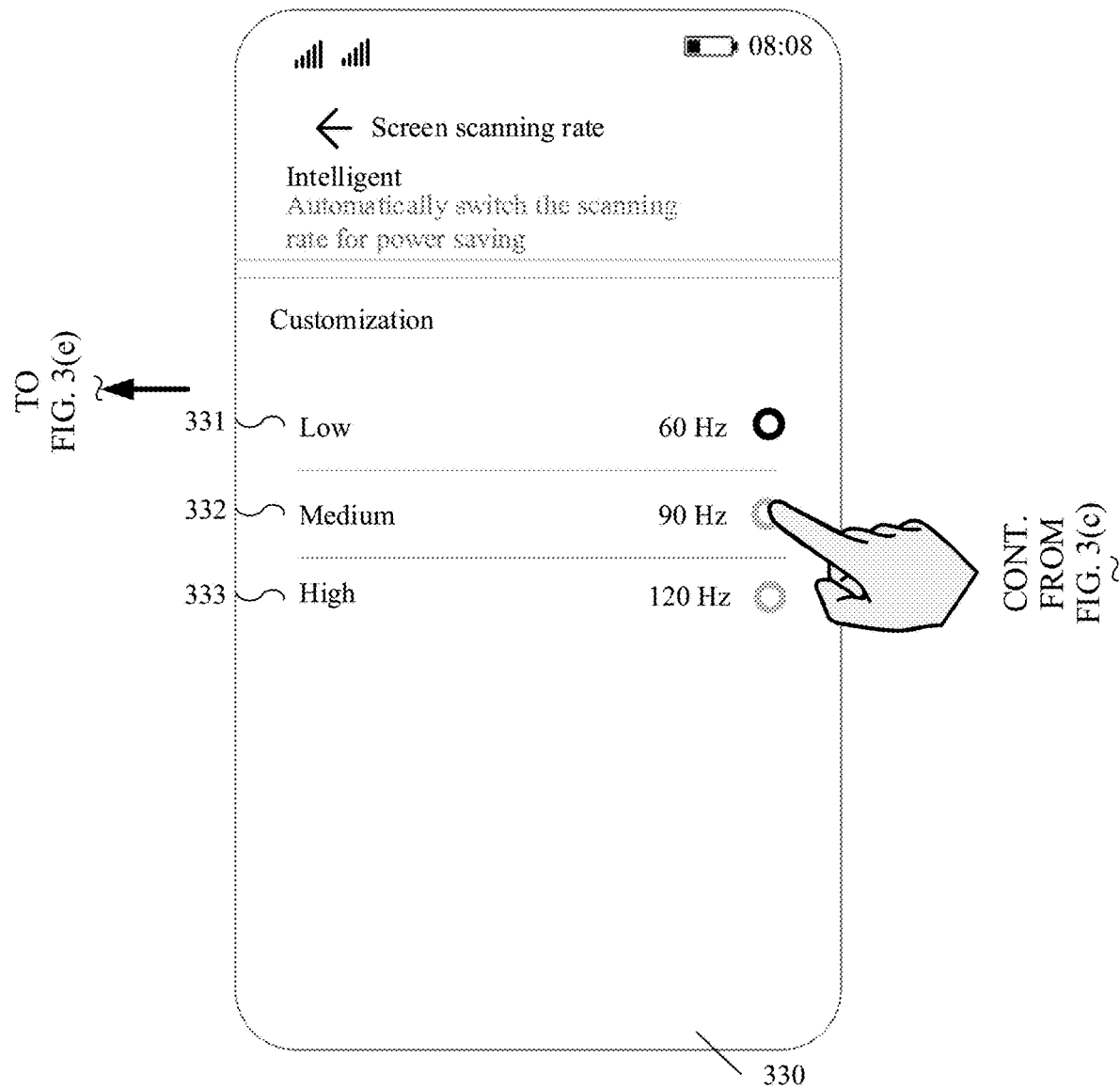
Figure 3E:
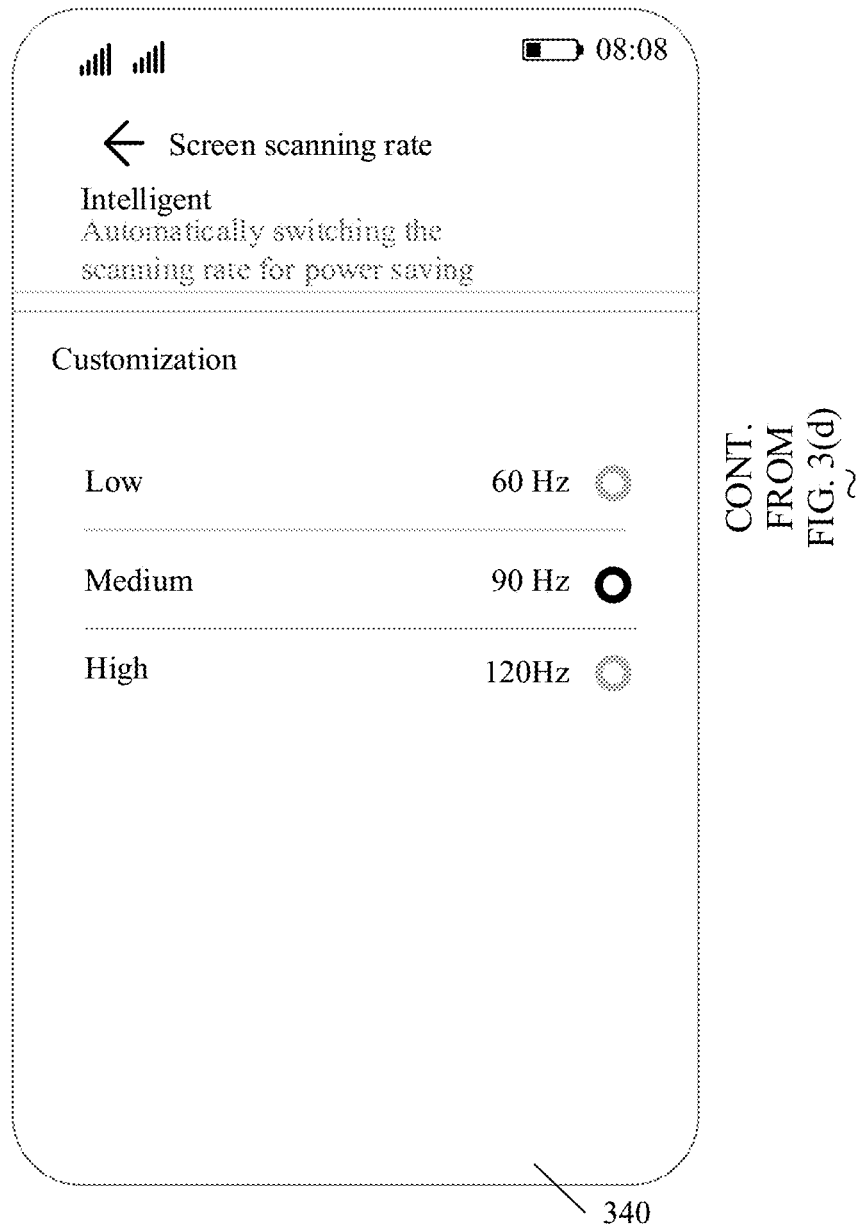
Figure 4A:
FIG. 4(a) to FIG. 4(e) are a schematic diagram of another group of interfaces according to an embodiment of this application.
Figure 4B:
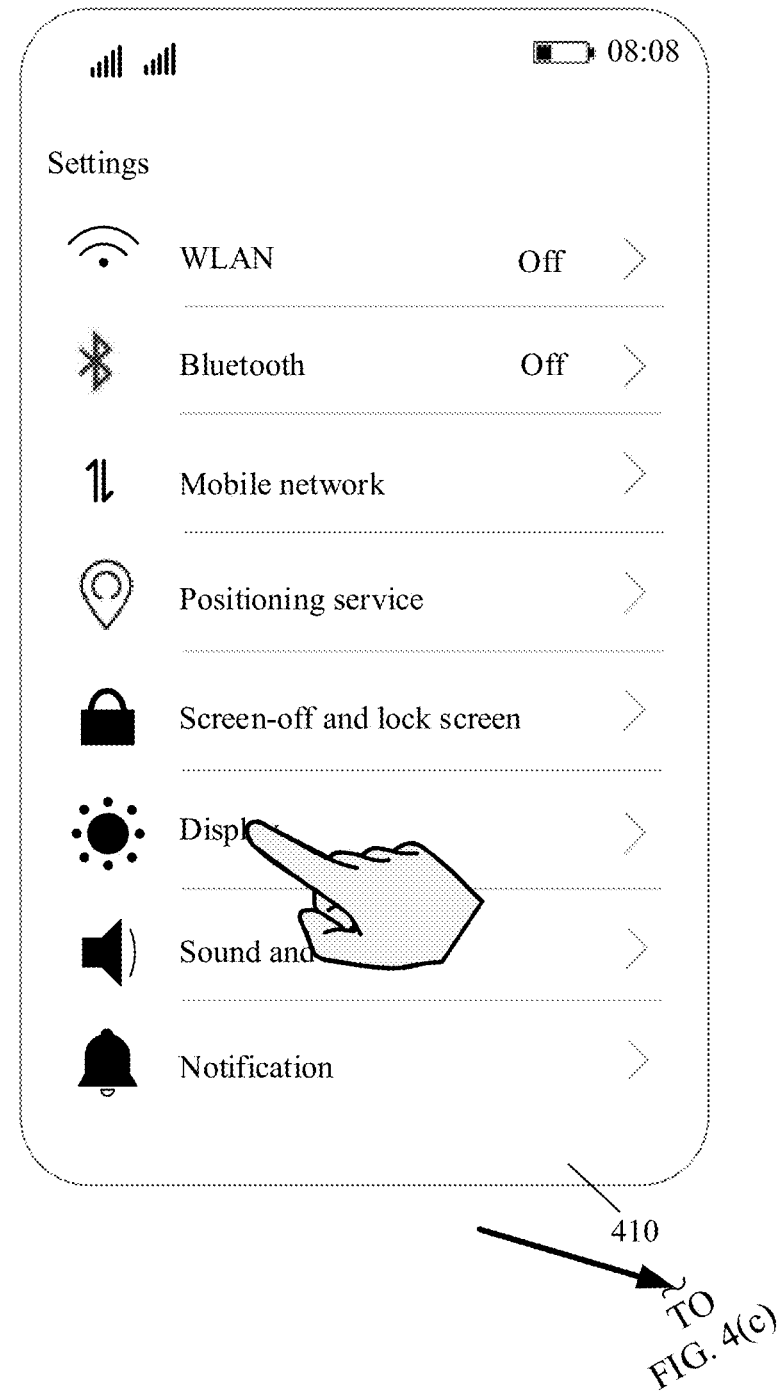
Figure 4C:
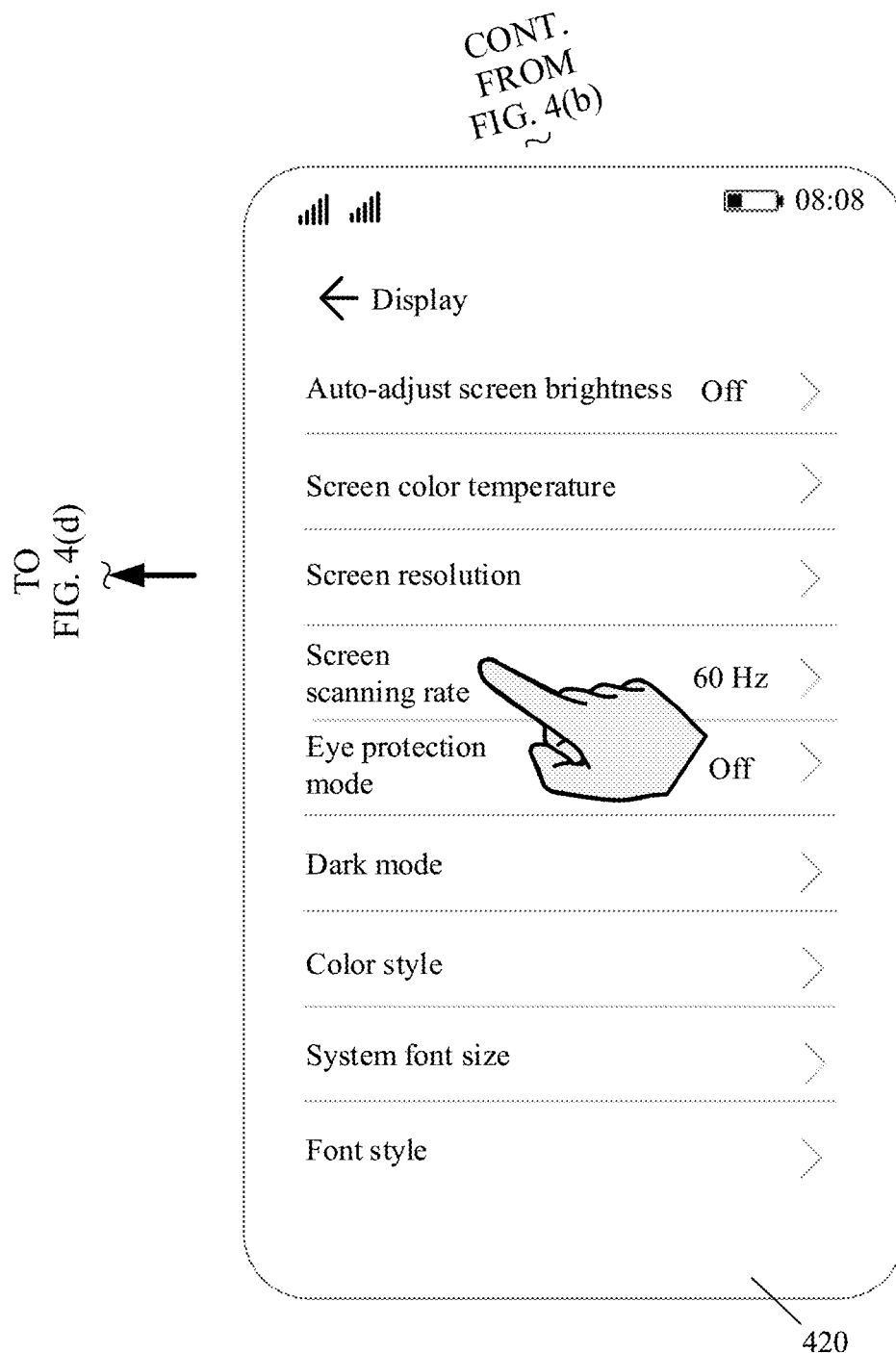
Figure 4D:
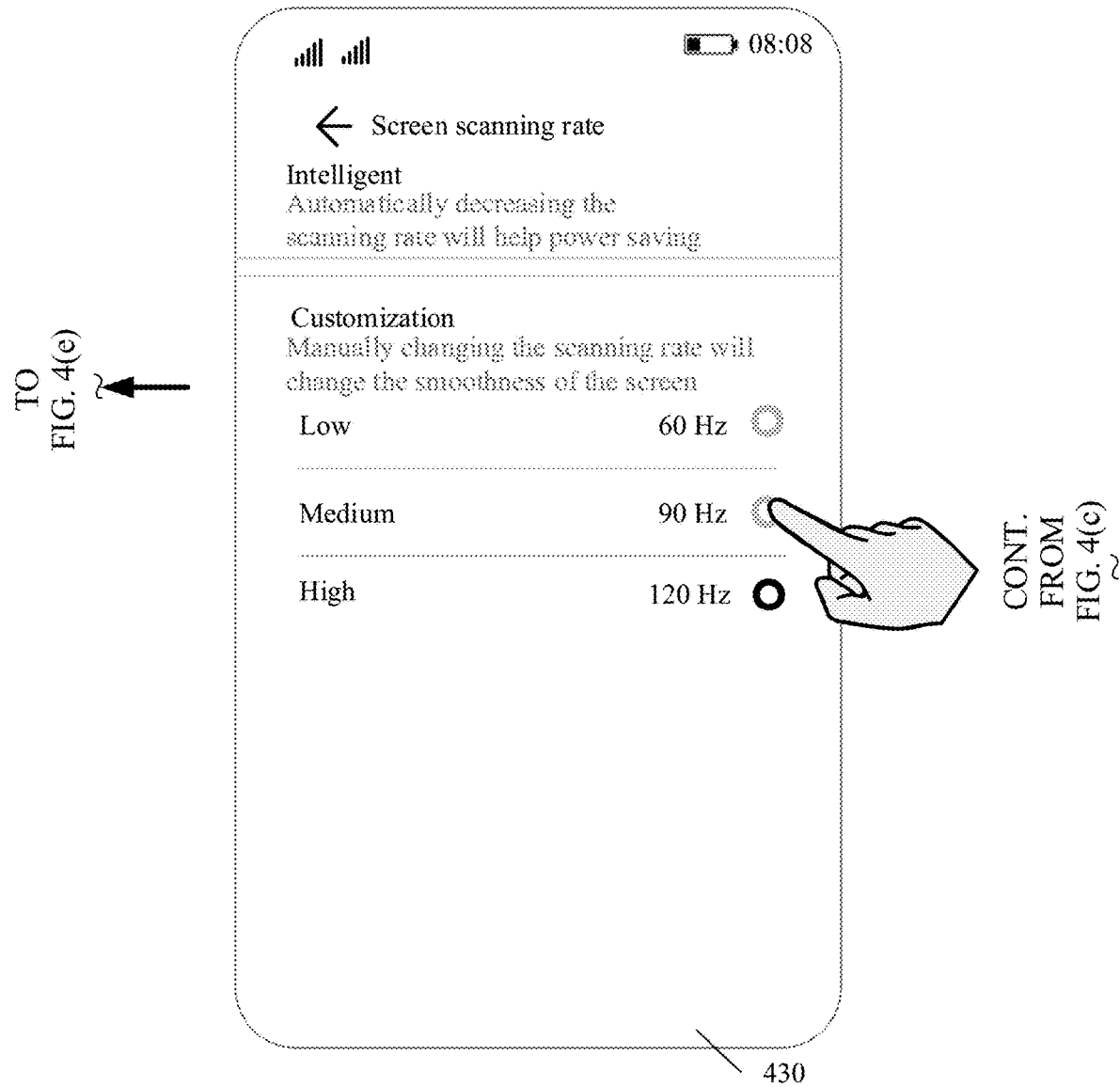
Figure 4E:
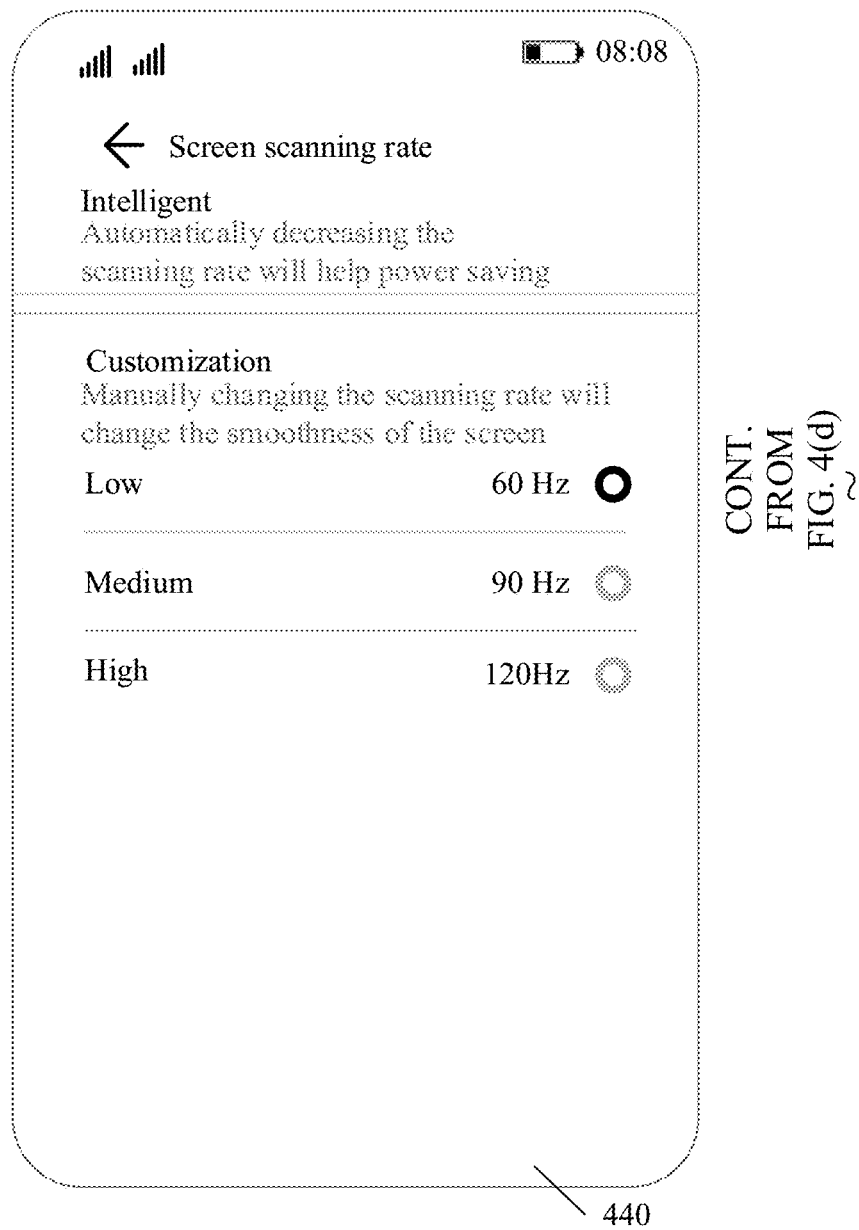

FIG. 3(a) shows a user interface 300 of a mobile phone. The user interface 300 may include an icon of at least one application, and a name of each application is below an icon of a corresponding application, for example, a WeChat icon, a QQ icon, a Memo icon, a Mailbox icon, a Cloud Sharing icon, an Alipay icon, a Gallery icon, a Settings icon 301, a Phone icon, a Messages icon, and a Camera icon. The icon of the application and the location of the name of the corresponding application may be adjusted based on a user preference. This is not limited in embodiments of this application. The user may tap the Settings icon 301. In response to the user operation, the mobile phone may display a user interface 310.

FIG. 3(*b*) shows the user interface 310 of the mobile phone. The user interface 310 may include controls such as a WLAN control, a Bluetooth control, a Mobile Network control, and a Display control 311. The user may tap the Display control 311. In response to the user operation, the mobile phone may display a user interface 320.

FIG. 3(*c*) shows the user interface 320 of the mobile phone. The user interface 320 may include controls such as an automatic screen brightness adjustment control, a screen color temperature control, a screen resolution control, and a screen scanning rate control. The user can tap the screen scanning rate control 321. In response to the user operation, the mobile phone may display a user interface 330.

FIG. 3(*d*) shows the user interface 330 of the mobile phone. The user interface 330 may include a smart control and a customized (screen scanning rate) control, and the customized control may include a low control 331, a medium control 332, and a high control 333. The smart control 331 may automatically reduce a switching scanning rate, which helps save power. In the customized control, a low screen scanning rate is 60 Hz, a medium screen scanning rate is 90 Hz, and a high screen scanning rate is 120 Hz. The user may tap the medium screen scanning rate control 332. In response to the user operation, the mobile phone may display a user interface 340.

FIG. 3(*e*) shows the user interface 340 of the mobile phone. The medium scanning rate in the user interface 330 has been switched to 90 Hz.

It should be noted that the schematic diagram of the interface of the electronic device shown in FIG. 3(*a*) to FIG. 3(*e*) is an example in embodiments of this application, and the schematic diagram of the interface of the electronic device may alternatively be in another form. This is not limited in embodiments of this application.

FIG. 4(*a*) to FIG. 4(*e*) are a schematic diagram of another group of interfaces.

FIG. 4(*a*) to FIG. 4(*e*) show a specific process of operating a screen scanning rate of a mobile phone by a user. For FIG. 4(*a*) to FIG. 4(*e*), refer to descriptions in FIG. 3(*a*) to FIG. 3(*e*). Details are not described herein.

FIG. 4(*d*) shows a user interface 430 of the mobile phone. For descriptions of the user interface 430, refer to a case in which a current scanning rate of the mobile phone is a high scanning rate, that is, 120 Hz, and the user taps a low screen scanning rate control. In response to the user operation, the mobile phone may display a user interface 440. The mobile phone may switch the screen scanning rate to 60 Hz.

It should be noted that the schematic diagram of the interface of the electronic device shown in FIG. 4(*a*) to FIG. 4(*e*) is an example in embodiments of this application, and the schematic diagram of the interface of the electronic device may alternatively be in another form. This is not limited in embodiments of this application.

Scenario 2: The electronic device may alternatively intelligently adjust a hardware scanning rate based on a touch operation performed by a user or an operation performed on a button.

When detecting an operation performed on the screen (for example, the user taps the screen) or an operation performed on the button, the electronic device may switch a current hardware scanning rate and a current software scanning rate from a low scanning rate to a high scanning rate, or may maintain a high scanning rate. When the screen of the electronic device is not touched, a current hardware scanning rate may be switched from a high scanning rate to a low scanning rate, or a low scanning rate may be maintained.

Figure 5A:
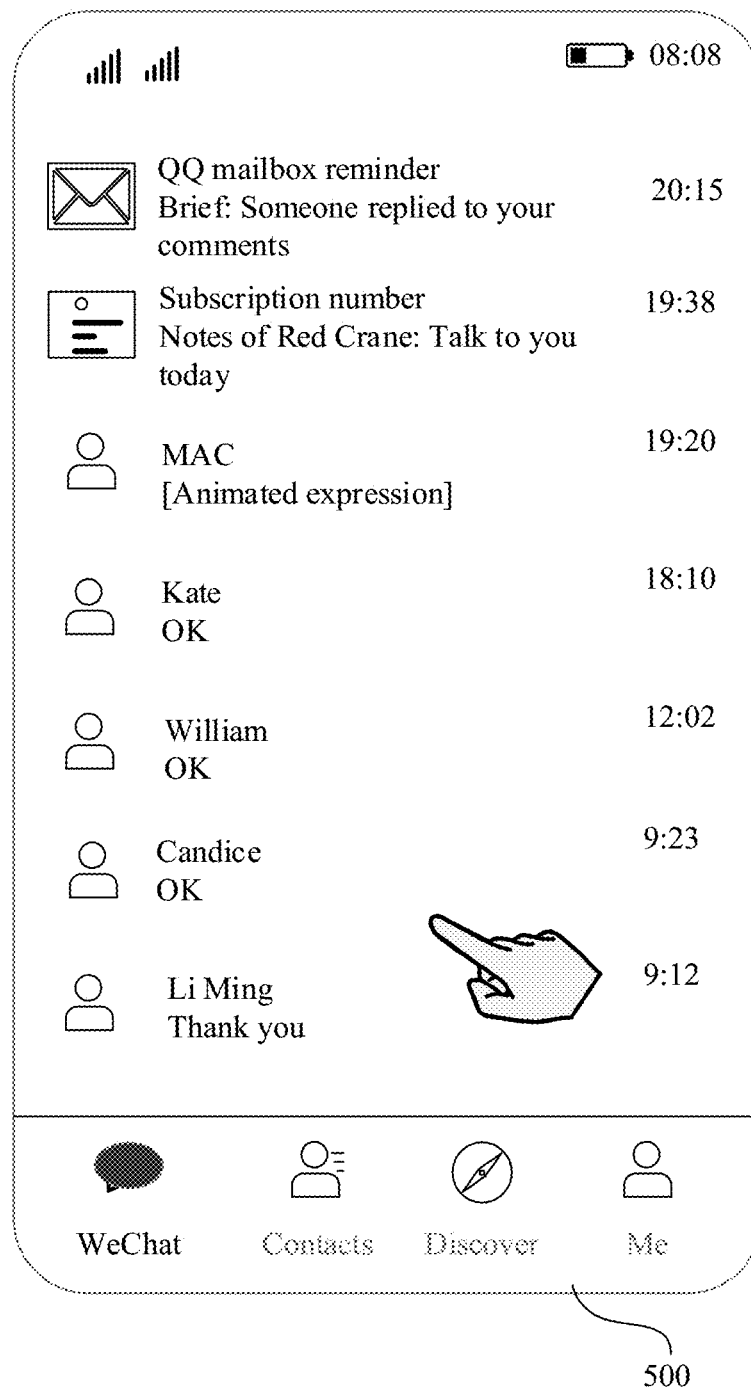
FIG. 5(a) and FIG. 5(b) are a schematic diagram of still another group of interfaces according to an embodiment of this application.
Figure 5B:
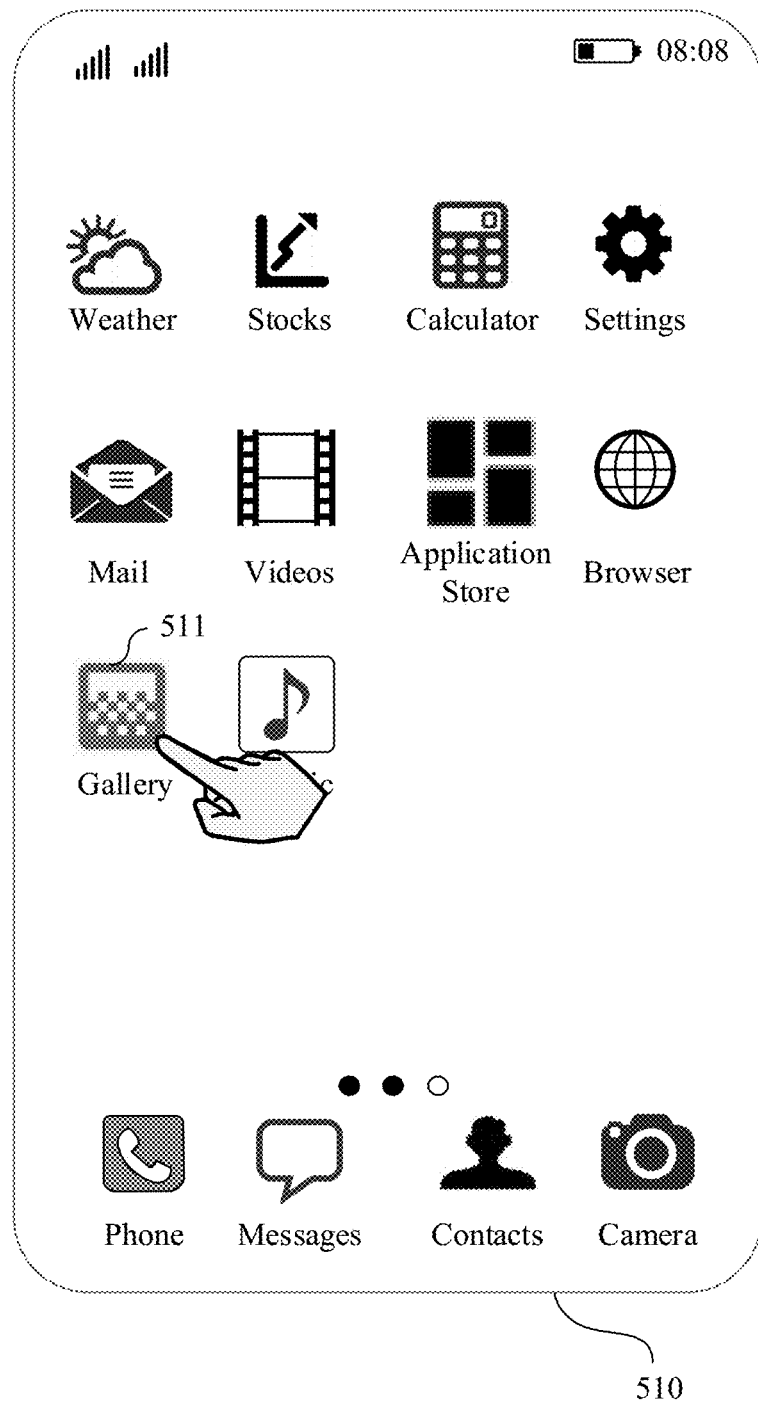
Figure 6A:
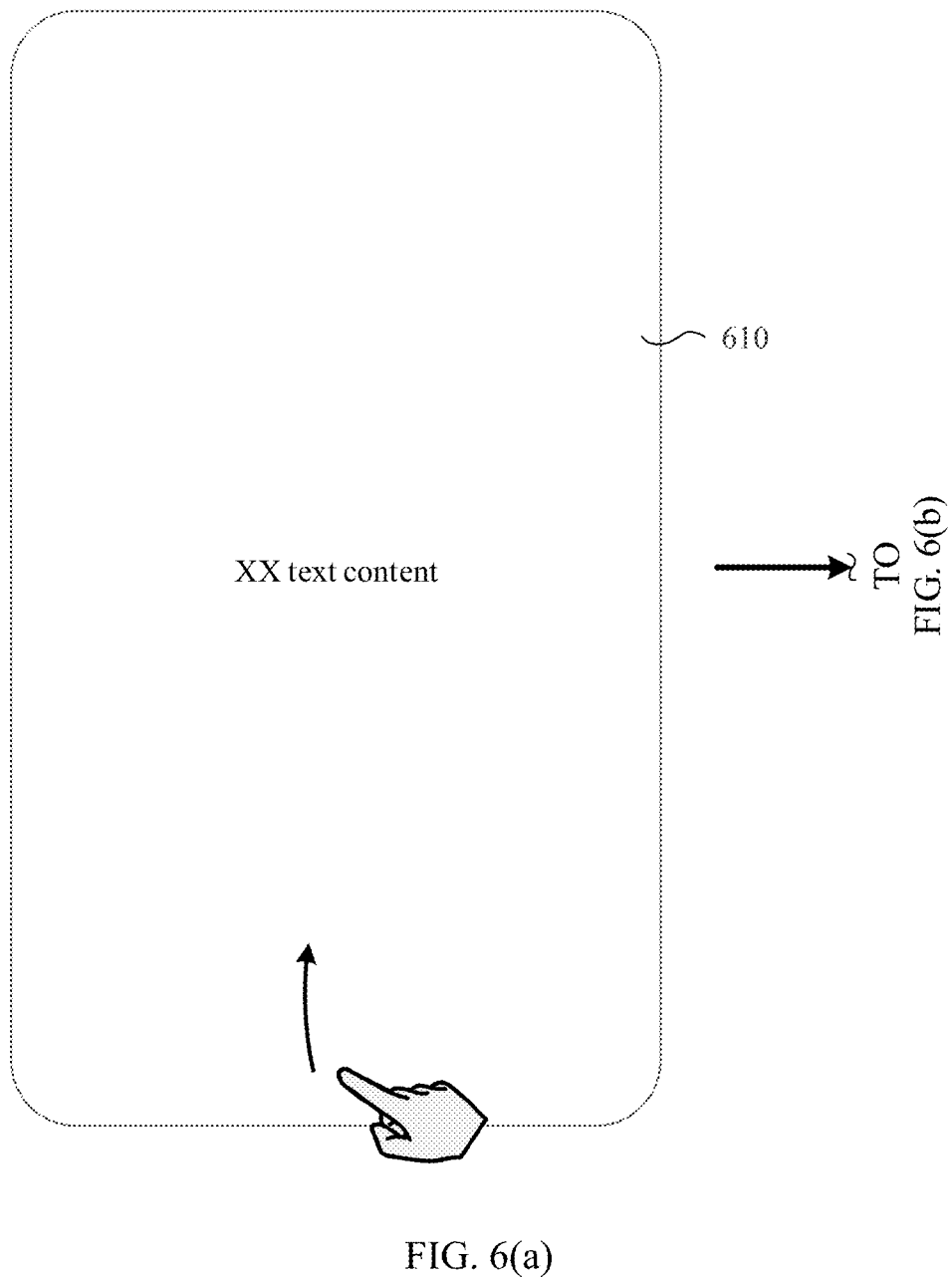
FIG. 6(a) to FIG. 6(d) are a schematic diagram of still another group of interfaces according to an embodiment of this application.
Figure 6B:
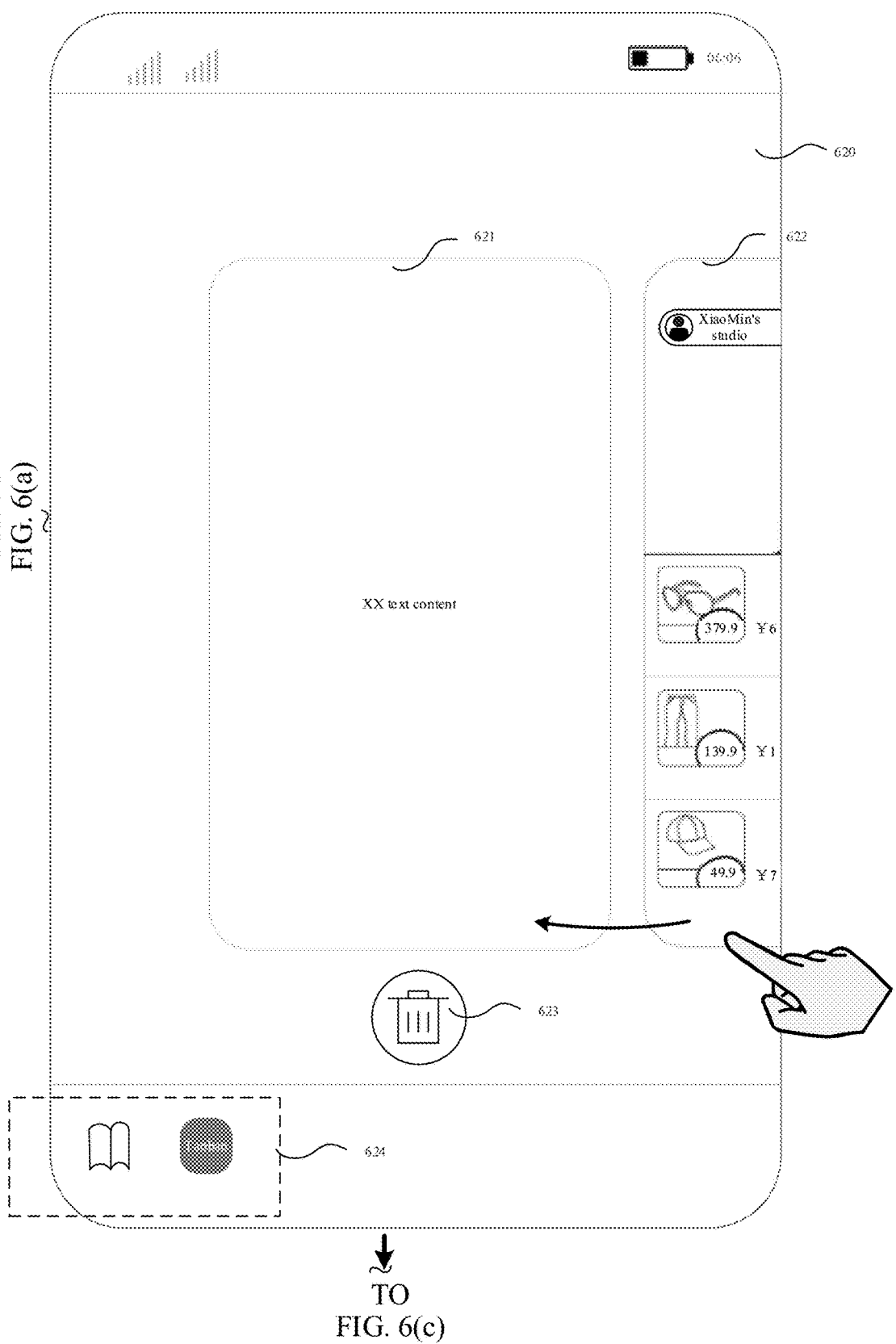
Figure 6C:
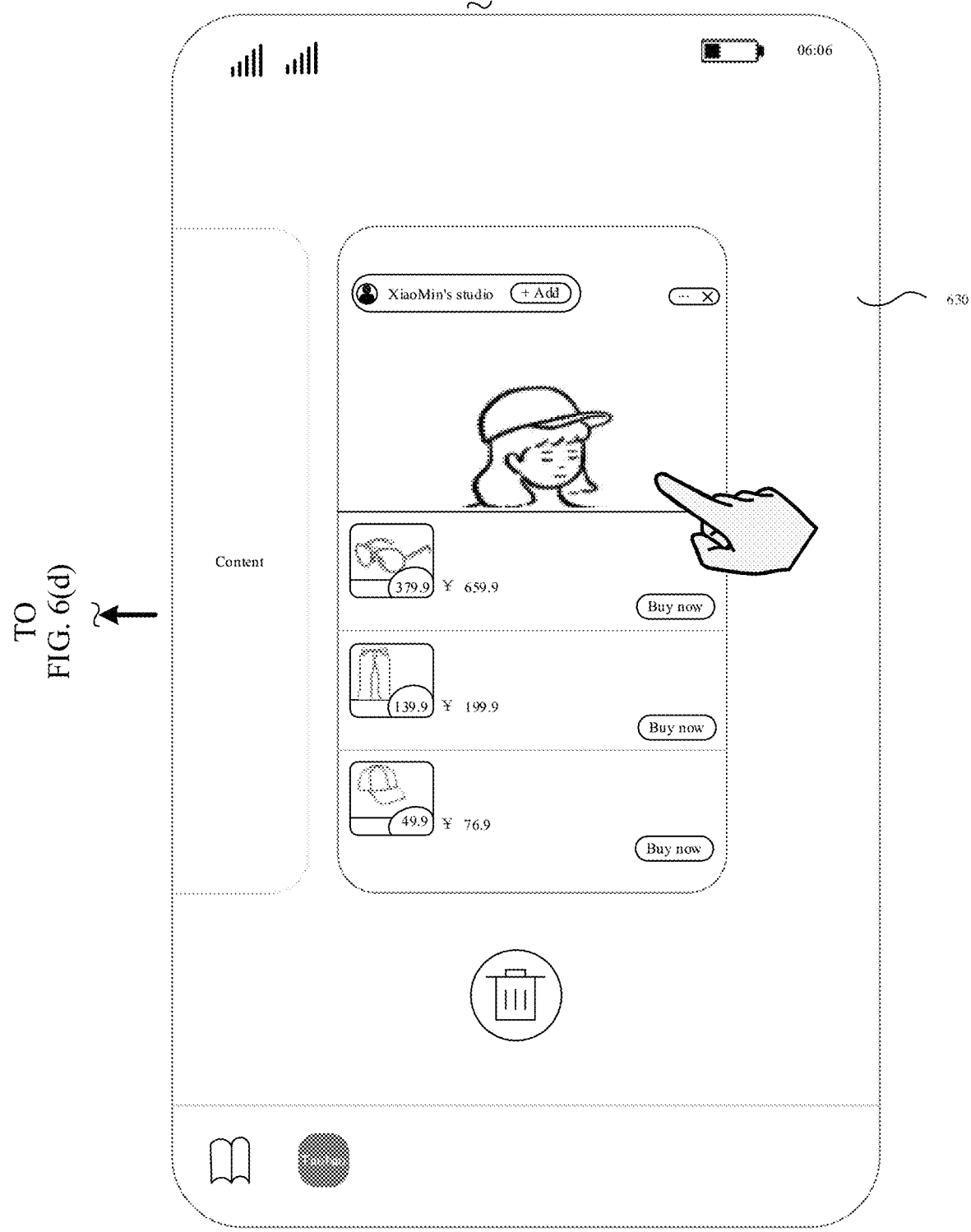
Figure 6D:
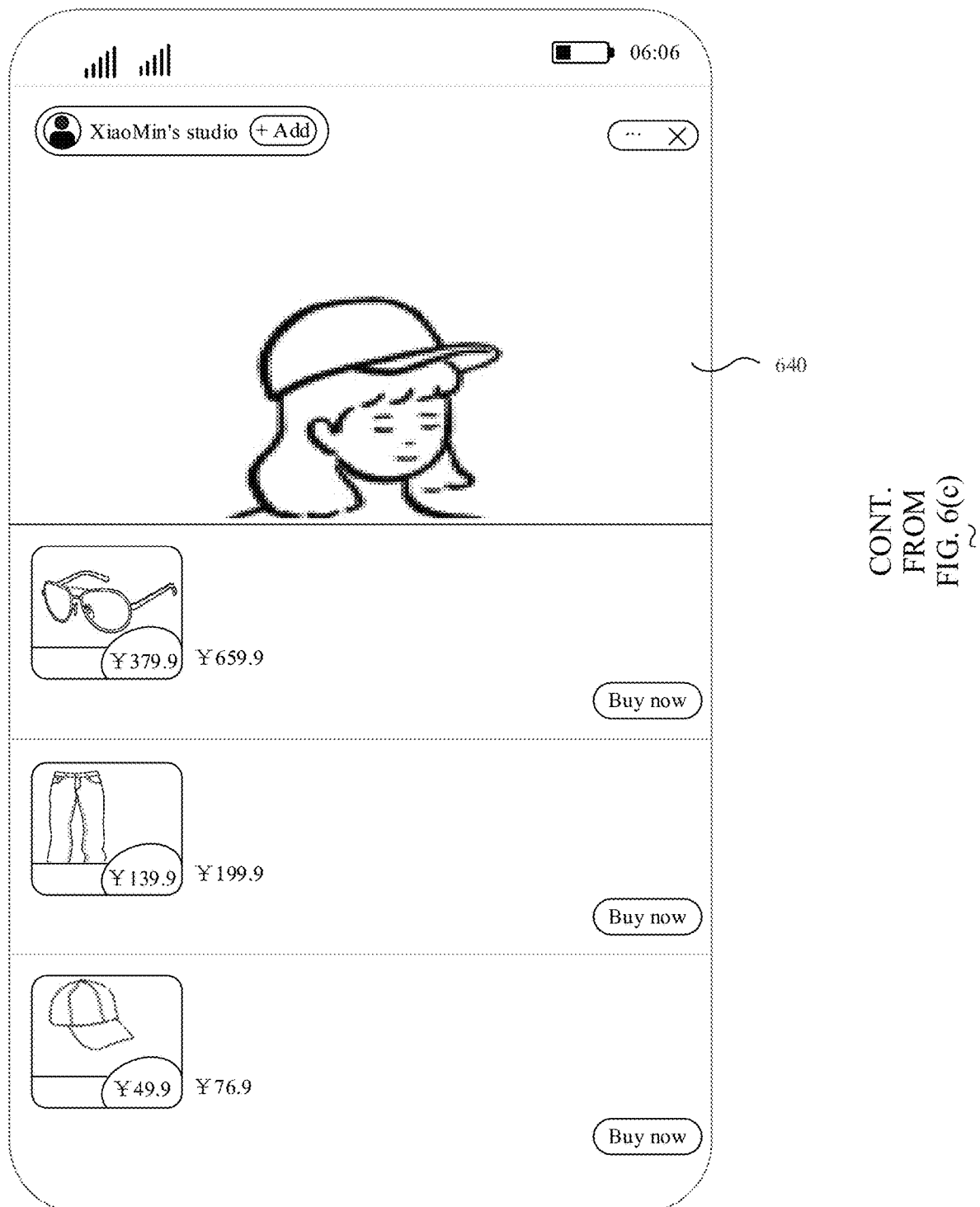
Figure 7A:
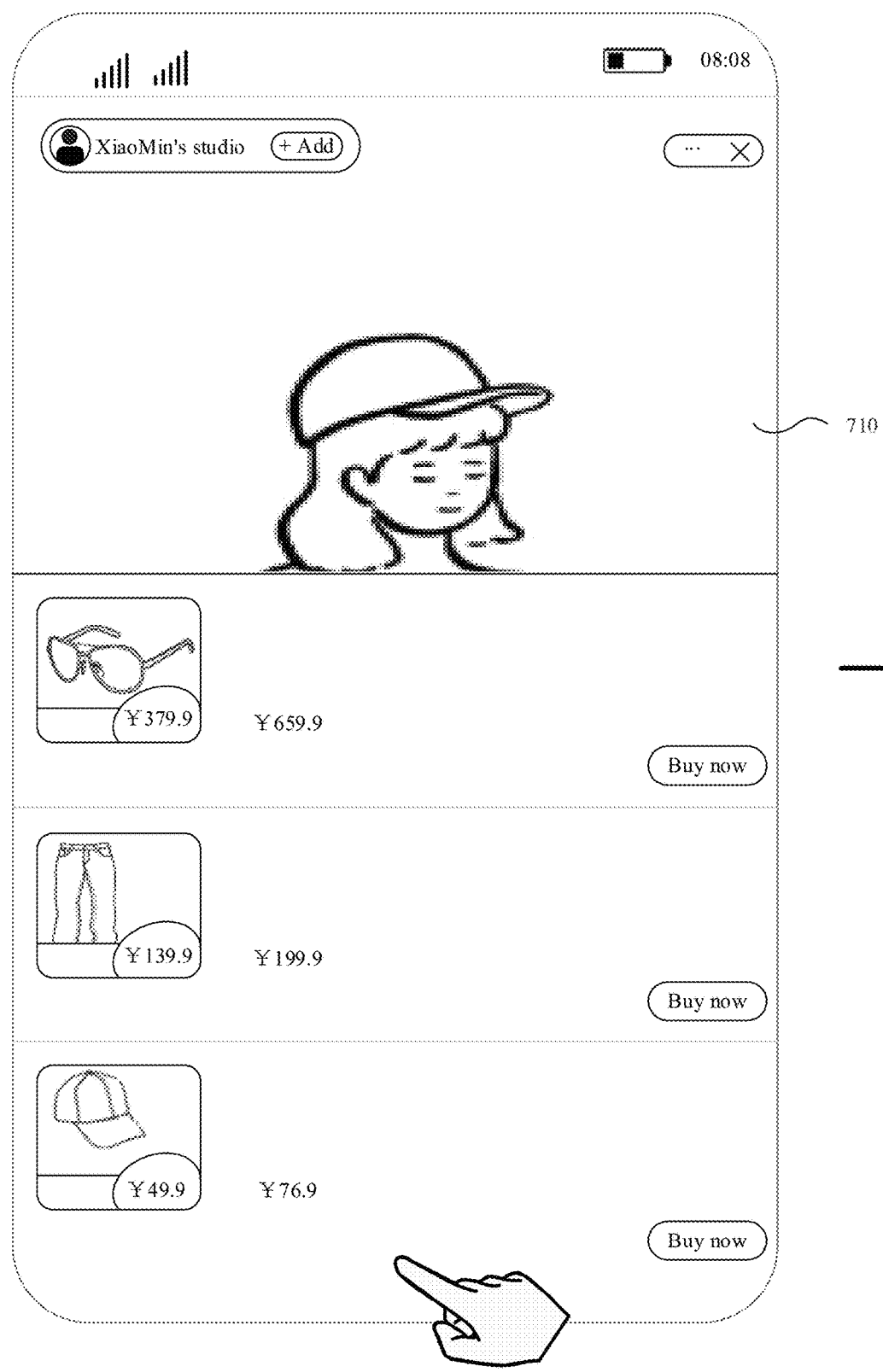
FIG. 7(a) to FIG. 7(d) are a schematic diagram of still another group of interfaces according to an embodiment of this application.
Figure 7B:
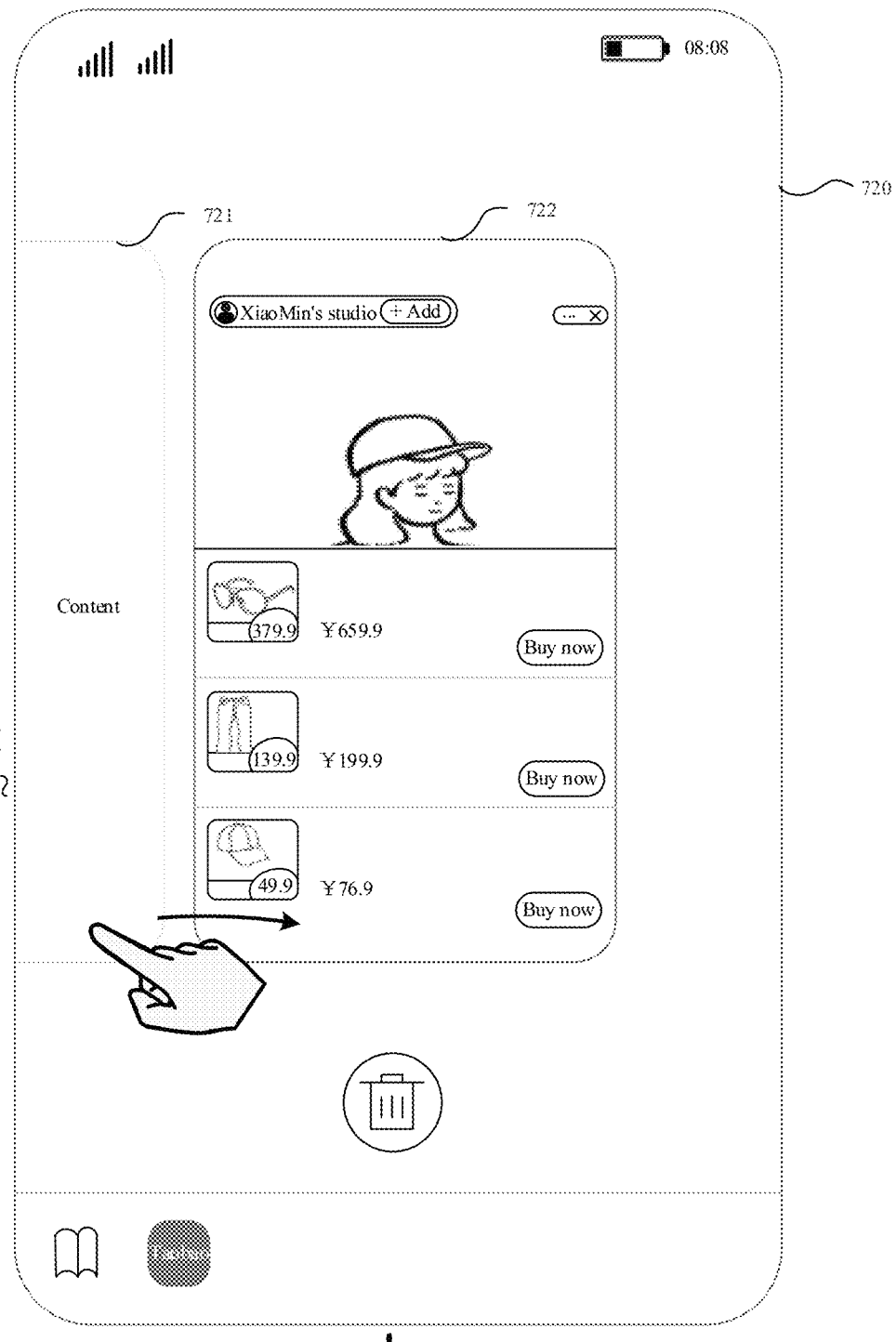
Figure 7C:
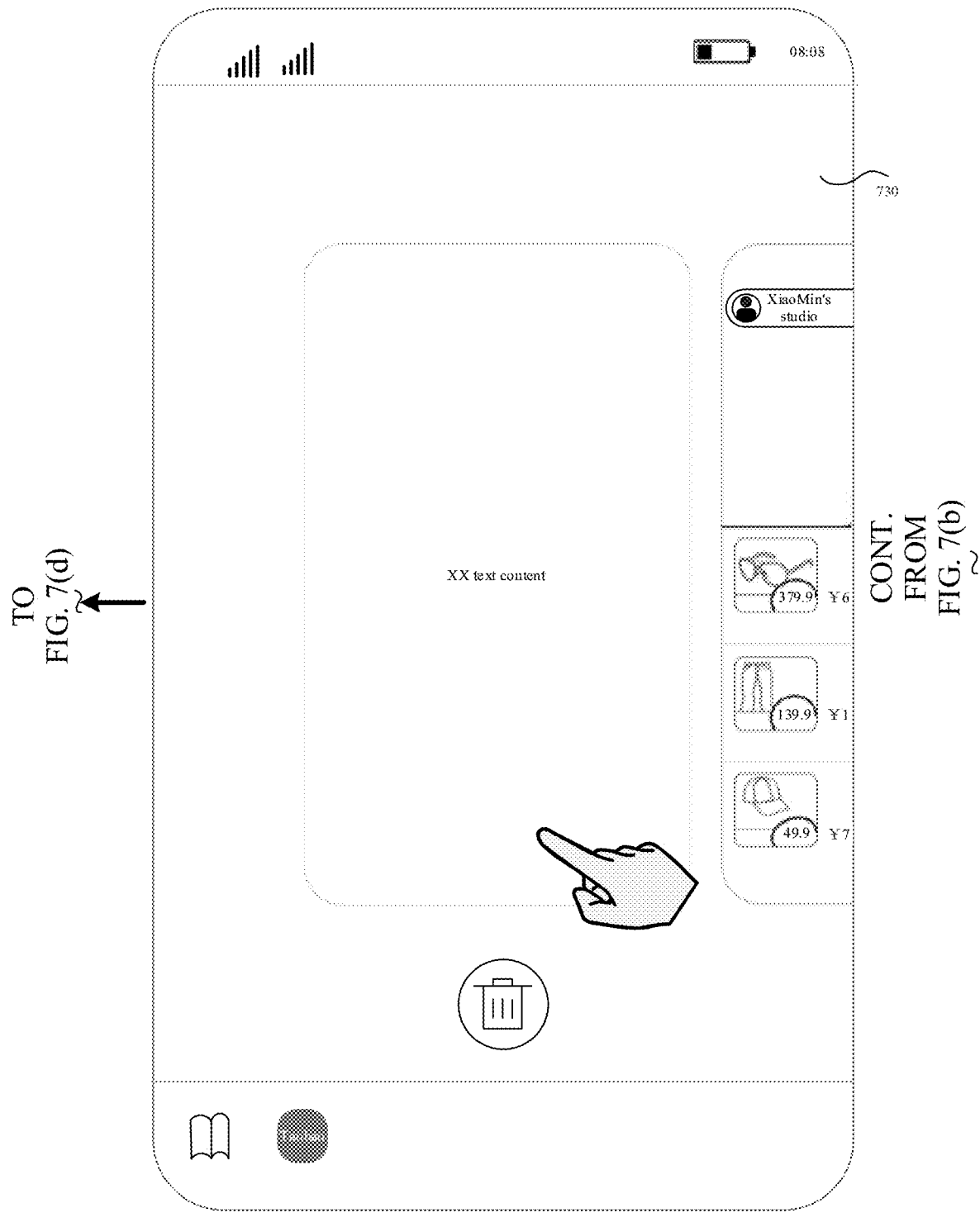
Figure 7D:
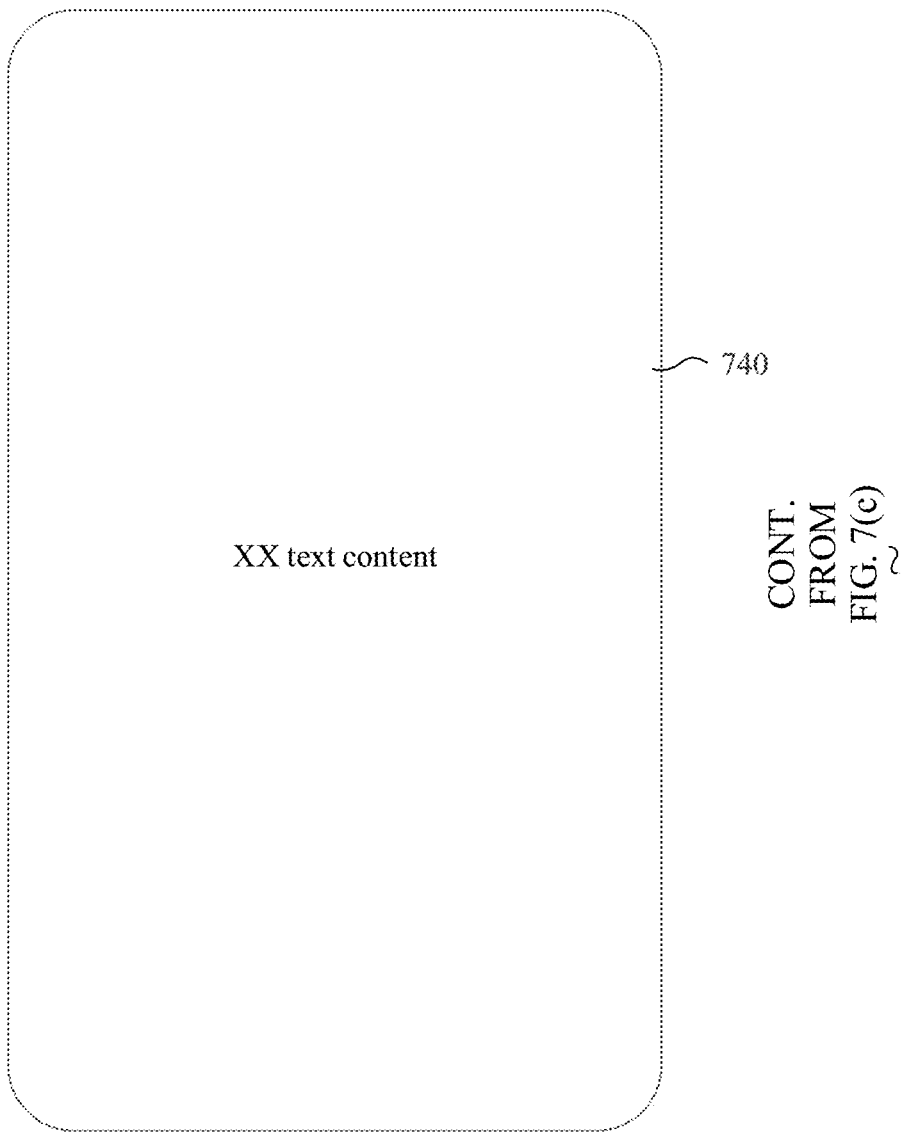

FIG. 5(*a*) and FIG. 5(*b*) are a schematic diagram of still another group of interfaces.

In an implementation, FIG. 5(*a*) shows an application interface 500 of WeChat of the mobile phone. As described above, when enabling a function of intelligently adjusting a scanning rate, the electronic device may automatically adjust the hardware scanning rate, that is, the screen scanning rate, based on a user operation. When the user taps a control of the application interface 500, the mobile phone may increase the screen scanning rate, for example, 120 Hz, in response to the tap operation of the user. It should be understood that the foregoing operation may be another operation, for example, touch and hold, pull down, left swipe, right swipe, or double tap.

In another implementation, FIG. 5(*b*) shows an application interface 510. The application interface 510 may include an icon of at least one application, and a name of each application is below an icon of a corresponding application, for example, Weather, Stock, Calculator, Gallery 511, and Camera. The icon of the application and the location of the name of the corresponding application may be adjusted based on a user preference. This is not limited in embodiments of this application. When the user touches the icon of Gallery, the electronic device may increase the hardware scanning rate, for example, 120 Hz, in response to the operation.

In still another implementation, when the foregoing operation of the user is not detected at a time interval, the electronic device may adjust the hardware scanning rate to a relatively low screen scanning rate. The electronic device may switch the screen scanning rate to 120 Hz by using the user operation shown in FIG. 5(*a*) or FIG. 5(*b*). After 2 s, if the electronic device still does not detect the user operation, the scanning rate of the electronic device may be switched to a relatively low scanning rate, for example, 60 Hz.

It should be noted that the schematic diagram of the interface of the electronic device shown in FIG. 5(*a*) and FIG. 5(*b*) is an example in embodiments of this application, and the schematic diagram of the interface of the electronic device may alternatively be in another form. This is not limited in embodiments of this application.

Scenario 3: The electronic device may alternatively adjust a hardware scanning rate based on an application running in the foreground.

The scanning rate is switched based on an application type. The electronic device may determine different scanning rates for different application types (for example, video applications) or application packages, that is, the electronic device may determine a correspondence between an application type or an application package and a scanning rate. When detecting that the electronic device is running or starts application software, the electronic device may switch the scanning rate to a corresponding scanning rate size according to the foregoing correspondence.

FIG. 6(*a*) to FIG. 6(*d*) are a schematic diagram of still another group of interfaces.

FIG. 6(*a*) shows a user interface 640 of the electronic device, and the user interface 610 may be a user interface used by the user for reading. The user interface 610 may include text content. FIG. 6(*d*) shows the user interface 640 of the electronic device. The user interface 640 may be a user interface used by the user for live shopping. The user interface 640 may include a live picture (for example, a character picture and Xiaomin's studio) and a shopping link (for example, glasses 379.9 yuan, trousers 139.9 yuan, and hats 49.9 yuan, and controls "buy now" corresponding to the three items).

The electronic device may start and simultaneously run a plurality of applications, and provide different services or functions for the user. That the electronic device simultaneously runs a plurality of applications means that the electronic device starts the plurality of applications, the plurality of applications are not closed, and the electronic device does not delete resources such as memory resources occupied by the plurality of applications. The plurality of applications simultaneously occupy the resources such as the memory resources in the background, but do not need to interact with the user in the foreground. For example, the electronic device successively starts two applications: Reader and Taobao, and simultaneously runs the two applications.

When the user uses a specific application, if the application switches or jumps to a home screen for operation, the electronic device does not kill an application previously used by the user, but reserves the previously used application as a background application in a multi-task queue.

When simultaneously running the plurality of applications, the electronic device may generate, based on the plurality of applications in the multi-task queue, cards separately corresponding to the applications. The plurality of cards in the multi-task interface are set horizontally in parallel according to a preset sequence policy. For example, in a sequence policy, the electronic device arranges cards corresponding to different applications in a sequence of running different applications.

After detecting a user operation that indicates to open a multi-task interface 620, the electronic device displays the multi-task interface 620. The multi-task interface 620 includes cards separately corresponding to a plurality of applications that are running on the electronic device. There may be a plurality of user operations that indicate to open the multi-task interface.

For example, when the electronic device detects an upward slide operation on the bottom of the electronic device, in response to the operation, as shown in FIG. 6(*b*), the electronic device displays the multi-task interface 620.

The multi-task interface 620 may include a card 621, a card 622, a deletion icon 623, and a switching menu 624. The card 621 is completely displayed, the card 622 is partially displayed, and the switching menu 624 includes a Reader icon and a Taobao icon.

The deletion icon 623 may be used to close an application corresponding to a complete card displayed in the current multi-task interface 620. Closing herein is deleting a resource such as a memory resource occupied by the application. In some embodiments, the deletion icon 623 may be used to close applications corresponding to all cards in the current multi-task interface 620.

It should be noted that the accompanying drawings are merely examples for description. The multi-task interface 620 shown in the accompanying drawings is an interface displayed on a touchscreen on the edge of the electronic device. A part of the card on the edge of the electronic device can be displayed on the touchscreen of the electronic device, and a part of the card outside the edge of the electronic device cannot be displayed on the touchscreen of the electronic device.

When the electronic device detects a user operation performed on the left side of the bottom of the electronic device, or when the electronic device detects a user operation performed on the right side of the bottom of the electronic device, the electronic device displays the user interface 620 shown in FIG. 6(*b*).

In the multi-task interface 620, the user may switch to display the cards in a left-right sliding manner in the multi-task interface 620. For example, when the electronic device detects a leftward slide operation in the multi-task interface 620, in response to the operation, the cards in the multi-task interface 620 sequentially move leftward. In this case, the electronic device may display a user interface 630, that is, may completely display the card 622, and partially display the card 621. The user may tap the card 622 in the task interface 630 to switch the application to an application interface corresponding to the card 622. In response to the foregoing operation, the electronic device may display a user interface 640.

The electronic device may determine that a screen scanning rate of an application corresponding to the card 621 is different from a screen scanning rate of an application corresponding to the card 622. For example, the screen scanning rate of the application corresponding to the card 621 is 60 Hz, and the screen scanning rate of the application corresponding to the card 622 is 120 Hz. Therefore, when the electronic device detects that the user switches the application corresponding to the card 621 to the application corresponding to the card 622, the electronic device may adjust the hardware scanning rate to 120 Hz.

FIG. 7(*a*) to FIG. 7(*d*) are a schematic diagram of still another group of interfaces.

In another case, FIG. 7(*a*) to FIG. 7(*d*) show a specific operation process of switching the application interface by the user. For detailed descriptions, refer to descriptions corresponding to FIG. 6(*a*) to FIG. 6(*d*). Details are not described herein again.

In the multi-task interface 720, the user may switch to display the cards in a left-right sliding manner in the multi-task interface 720. For example, when the electronic device detects a rightward slide operation in the multi-task interface 720, in response to the operation, the cards in the multi-task interface 720 sequentially move rightward. In this case, the electronic device may display a user interface 730, that is, may completely display the card 721, and partially display the card 722. The user may tap the card 721 in the task interface 730 to switch the application to an application interface corresponding to the card 721. In response to the foregoing operation, the electronic device may display a user interface 740.

The electronic device may determine that a screen scanning rate of an application corresponding to the card 721 is different from a screen scanning rate of an application corresponding to the card 722. For example, the screen scanning rate of the application corresponding to the card 721 is 60 Hz, and the screen scanning rate of the application corresponding to the card 722 is 120 Hz.

It should be noted that the schematic diagram of the interface of the electronic device shown in each of FIG. 6(*a*) to FIG. 6(*d*) and FIG. 7(*a*) to FIG. 7(*d*) is an example in embodiments of this application, and the schematic diagram of the interface of the electronic device may alternatively be in another form. This is not limited in embodiments of this application.

The display of the electronic device is charged and discharged by using an electronic component of a pixel on the screen, to emit light. At different hardware scanning rates, charging and discharging times of the electronic component are different, and therefore charging currents and/or voltages of light emitting component are different. Further, a difference in currents and/or voltages of different hardware scanning rates may result in a difference in brightness of the display. A sudden change may occur in screen brightness of the electronic device when switching is performed between different hardware scanning rates.

It is learned that FIG. 2a shows a change curve of brightness perceived by a human eye in different ambient brightness, and the curve may be approximately the Gamma curve shown in FIG. 2a. A horizontal coordinate x represents brightness naturally incident to a human eye, and a vertical coordinate y represents brightness perceived by a human. The brightness may be represented by a gray scale. It can be learned from FIG. 2a that the brightness naturally incident to the human eye changes nonlinearly with the brightness perceived by the human. When the natural brightness is relatively dark (the brightness incident to the human eye is relatively small), a small brightness increase results in a significant increase in the perceived brightness. When the natural brightness reaches a specific value, a brightness change perceived by the human gradually decreases. It can be learned that a sensitivity of the human eye to the screen brightness change in a bright light environment is different from that in a dark light environment. When the brightness is relatively high, the sensitivity of the human eye to the brightness change is relatively low, that is, the brightness change is not easily perceived by the human eye when the screen scanning rate is switched. When the brightness is relatively low, the sensitivity of the human eye to the brightness change is relatively high, and a sudden change in the screen brightness may be perceived.

When the hardware scanning rate is not switched, after the Gamma curve is used for correction, the input voltage of the display is proportional to the brightness perceived by the human eye (that is, Gamma=1). However, when the hardware scanning rate is switched, the brightness of the display changes. In a dark light condition, the brightness perceived by the human eye changes greatly, but the Gamma curve used for correction remains unchanged. Therefore, in the dark light condition, input voltages of displays with different hardware scanning rates are different from a brightness curve perceived by the human eye.

When an existing screen scanning rate is adjusted, an environment in which the user is located during adjustment is not considered. When the user is in a dark light environment, if the hardware scanning rate is adjusted, the user may perceive that the screen blinks. If the hardware scanning rate and the software scanning rate remain unchanged, power consumption of the electronic device is relatively high.

In embodiments of this application, when the screen scanning rate needs to be switched, the electronic device determines, by determining an environment in which the user is currently located, whether the hardware scanning rate needs to be adjusted. For example, when the electronic device determines that the electronic device is in a dark light environment, if the hardware scanning rate needs to be switched from a high scanning rate to a low scanning rate, the hardware scanning rate is not changed, but the software scanning rate is switched to a low scanning rate. If the electronic device determines that the electronic device is in a bright light environment, both the hardware scanning rate and the software scanning rate may be switched. In this way, power consumption of the electronic device can be reduced, and it can be ensured that the user does not see a flicker or a blink. This improves user experience.

Figure 8:
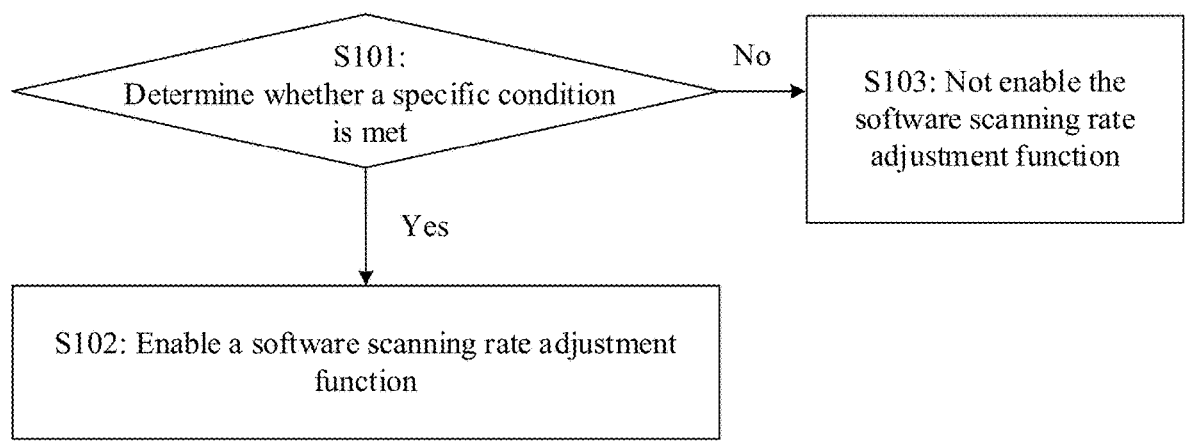
FIG. 8 is a schematic flowchart of a display method according to an embodiment of this application.

The following describes in detail a display method disclosed in embodiments of this application by using an embodiment in FIG. 8.

S101: An electronic device determines whether a specific condition is met, and if yes, performs step S102, or otherwise, performs step S103.

The specific condition may be an ambient light condition of the electronic device, or may be a screen brightness condition, or may be a time condition, or may be a location condition. This is not limited herein.

Implementation 1: The electronic device determines, based on ambient light brightness and/or screen brightness, whether a dark light condition is met.

The specific condition may be a dark light condition, and the dark light condition means that an environment in which the electronic device is located is relatively dark or screen brightness is relatively dark. For example, when the ambient light brightness is less than or equal to a first threshold, or the screen brightness is less than or equal to a second threshold, the electronic device meets a dark light condition. For example, a value range of the first threshold may be 200 to 400 lux (lux), and a value range of the second threshold may be 100 to 400 nit (nit).

In some embodiments, the electronic device may collect the ambient light brightness by using an ambient light sensor. There are many specific cases about the ambient light brightness collected by the electronic device. The ambient light brightness changes with a specific environment condition. For example, when a light in a room in which the electronic device is located is turned off or turned on, or ambient light of the electronic device is shielded, the ambient light brightness collected by the ambient light sensor is low. In this case, a value of the ambient light brightness collected by the electronic device decreases. In this scenario, it may be determined that the electronic device is in a dark light condition.

In some embodiments, the electronic device may simultaneously determine whether ambient light brightness and screen brightness meet a condition. For example, when the ambient light brightness is greater than a first threshold and the screen brightness is less than or equal to a second threshold, the electronic device determines that a dark light condition is met.

In some other embodiments, the electronic device may separately determine whether ambient light brightness and screen brightness meet a condition. For example, whether the ambient light brightness of the electronic device is greater than a first threshold. If the ambient light brightness is greater than the first threshold, the electronic device determines that a dark light condition is not met. Otherwise, the dark light condition is met. The electronic device may further determine whether the screen brightness is greater than a second threshold. If yes, the electronic device determines that the dark light condition is met. Otherwise, the dark light condition is not met.

When the electronic device determines that the dark light condition is met, step S102 is performed. If the electronic device determines that the dark light condition is not met, step S103 is performed.

Implementation 2: The electronic device detects, based on a current time, whether the electronic device is in a specific condition.

The electronic device may determine, based on the current time, whether the current time is day or night, and when the current time is night, may determine that the electronic device is in the specific condition. For example, the electronic device may learn that the current time (a first time) of the electronic device is 22:22, and may determine whether the current time is night in Beijing time. Therefore, the electronic device may determine that the electronic device is currently in the specific condition.

Implementation 3: The electronic device detects, based on a current location, whether the electronic device is in a specific condition.

When the current location of the electronic device has relatively low ambient brightness, the electronic device may determine, based on the location, that the current location of the electronic device is in the specific condition. For example, the electronic device may learn, by using a global positioning system (global positioning system, GPS), that the current location of the electronic device is a cinema. Because ambient brightness of the cinema is very low, it may be determined that the electronic device is currently in the specific condition.

When the electronic device determines that the specific condition is met, step S102 is performed. If the electronic device determines that the specific condition is not met, step S103 is performed.

In some embodiments, the electronic device may alternatively determine, by using a current time and a current location, whether the electronic device is in a specific condition, and details are not described.

It should be noted that the electronic device may detect, in real time, whether a specific condition is met, or may determine, when a user operation is detected or a scanning rate needs to be switched, whether a specific condition is met. This is not limited in embodiments of this application.

Different conditions may trigger the electronic device to start detecting whether a specific condition is met. In one case, the electronic device may determine, based on a change condition of the foregoing ambient light brightness, screen brightness, time, and location, whether a specific condition is met. For example, when the ambient light brightness changes, the electronic device may be triggered to start determining whether the specific condition is met. In another case, the electronic device may alternatively periodically detect whether a specific condition is met. For example, at an interval of 5 s, the electronic device detects whether the specific condition is met. In still another case, when the electronic device is in a screen-off state, whether a specific condition is met may not be detected. Otherwise, whether the specific condition is met may be detected.

It should be noted that, in the foregoing embodiment, the electronic device may determine, based on at least one of the ambient light brightness, the screen brightness, the current time, and the current location, whether the specific condition is met.

S102: The electronic device enables a software scanning rate adjustment function.

The software scanning rate adjustment function means that when the electronic device adjusts a screen scanning rate, the electronic device may adjust only a software scanning rate in different cases without adjusting a hardware scanning rate.

In some embodiments, when the electronic device detects that the specific condition is met, the current hardware scanning rate remains unchanged. When the screen scanning rate needs to be switched, for example, the foregoing three cases in which the screen scanning rate needs to be switched, the electronic device switches only the software scanning rate, and keeps the hardware scanning rate unchanged. For a manner of switching the software scanning rate, refer to a method in FIG. 9. Details are not described herein.

In some other embodiments, the electronic device may determine, based on an operation of a user and a hardware scanning rate before the specific condition is met, whether to adjust the screen scanning rate. For example, when the hardware scanning rate before the specific condition is met is a high scanning rate, the electronic device is operated by the user in a dark light condition, and both the hardware scanning rate and the software scanning rate that are maintained by the electronic device are high scanning rates. When the user ends the operation in the dark light condition, the electronic device switches the software scanning rate to a low scanning rate, for example, decreases the software scanning rate to 1/n of the hardware scanning rate, where n is a positive integer. In addition, the electronic device maintains a high hardware scanning rate. For another example, when the hardware scanning rate before the specific condition is met is a low scanning rate, the hardware scanning rate and the software scanning rate are switched to high scanning rates during the operation of the user. When the user ends the operation in the dark light condition, the electronic device switches the software scanning rate to a low scanning rate, for example, decreases the software scanning rate to 1/n of the hardware scanning rate, where n is a positive integer. In addition, the electronic device maintains a high hardware scanning rate.

In some other embodiments, when the electronic device needs to switch the current scanning rate, the software scanning rate may be switched to a target scanning rate, and the current hardware scanning rate remains unchanged. The target scanning rate is a scanning rate that the electronic device needs to switch to. For example, both the current hardware scanning rate and the software scanning rate are 120 Hz, and when the target scanning rate is 60 Hz, the software scanning rate is switched to 60 Hz, and the hardware scanning rate remains unchanged at 120 Hz. When the current hardware scanning rate is 120 Hz, the software scanning rate is 60 Hz, and the target scanning rate is 120 Hz, the software scanning rate is switched to 120 Hz, and the hardware scanning rate remains unchanged at 120 Hz. When the current hardware scanning rate is 120 Hz, the software scanning rate is 60 Hz, and the target scanning rate is 240 Hz, the software scanning rate is switched to 120 Hz, and the hardware scanning rate remains unchanged at 120 Hz. When the current hardware scanning rate is 120 Hz, the software scanning rate is 120 Hz, and the target scanning rate is 240 Hz, the software scanning rate remains unchanged at 120 Hz, and the hardware scanning rate remains unchanged at 120 Hz. The electronic device may first determine the software scanning rate and the target scanning rate, and then may switching the software scanning rate to a low scanning rate: 1/N of the hardware scanning rate. A software scanning rate obtained after the switching is equal to or close to the target scanning rate. N is a positive integer. N may be fixed, or may be changed. In one case, the electronic device may set a value of N. For example, the electronic device may set N to 2. When both the hardware scanning rate and the software scanning rate are 120 Hz, it may be determined that a first value is 120/2, that is, 60 Hz. The electronic device may switch the software scanning rate to a low scanning rate: 60 Hz. In another case, the electronic device may alternatively determine a value of N based on the hardware scanning rate and the target scanning rate, and then may determine a first value based on N. For example, the current hardware scanning rate is 240 Hz, and the target scanning rate of the electronic device is Hz. The electronic device may determine that N is 240/60, that is, 4, and the first value is 240/4, that is, 60 Hz. In this case, when N is not an integer, the value of N may be determined through round-up or round-down. The foregoing description is merely an example, and does not constitute a limitation. Switching the software scanning rate may be increasing the software scanning rate, or may be decreasing the software scanning rate.

Figure 9:
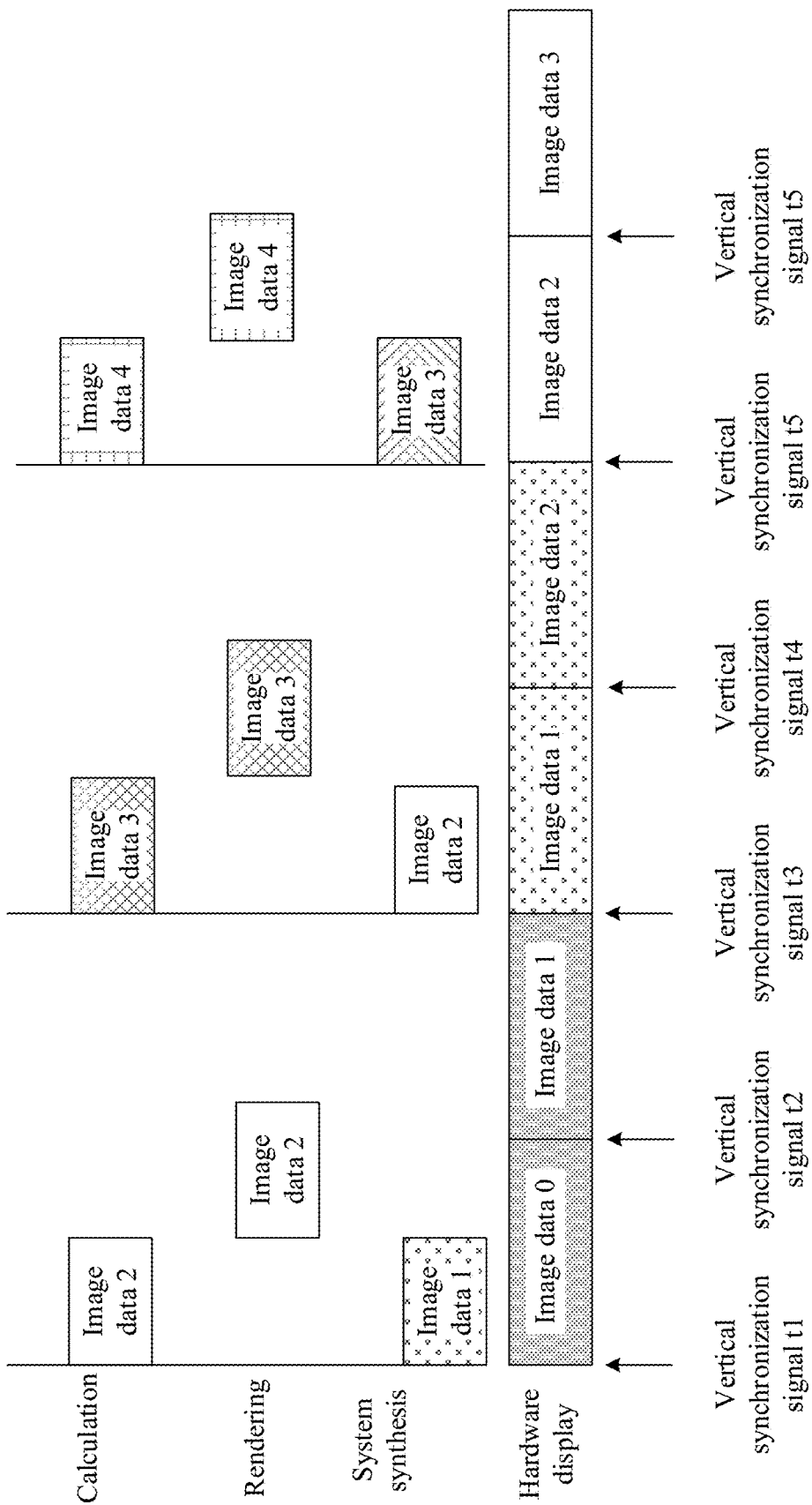
FIG. 9 is a schematic diagram of another image display procedure according to an embodiment of this application.

FIG. 9 shows a software scanning rate adjustment manner.

As shown in FIG. 9, the electronic device may first determine that a time length of a periodicity corresponding to the hardware scanning rate (vertical scanning frequency) is a first time interval. When N is 2, the electronic device may determine that a second time interval is twice the first time interval (a time interval between two adjacent vertical synchronization signals), and then may determine that the software scanning rate is half of the hardware scanning rate. That is, the electronic device may generate one vertical synchronization signal at an interval of the first time interval by using a display driver. After receiving two vertical synchronization signals, the electronic device may successively perform calculation, rendering, system synthesis, and display on image data. When N is 2, on a screen of the electronic device, hardware scanning is performed at an interval of one first time interval, and software scanning is performed at an interval of two first time intervals. For example, when the first scanning rate is 120 Hz, the second scanning rate may be determined as 60 Hz. For specific descriptions, refer to related descriptions corresponding to FIG. 1. Details are not described herein again.

With reference to a specific scenario, the software scanning rate adjustment function is described as follows:

In one implementation, it is assumed that the electronic device does not meet a specific condition (for example, a light is turned on) and the hardware scanning rate is a low scanning rate. In this case, after the electronic device detects that the specific condition is met (for example, the light in an environment in which the electronic device is located is turned off), when the electronic device detects, for the first time, an operation of touching the screen by the user (for example, the user taps the screen for the first time after the light is turned on), the electronic device switches the hardware scanning rate from a low scanning rate to a high scanning rate.

In another implementation, it is assumed that the electronic device does not meet a specific condition (for example, a light is turned on) and the hardware scanning rate is a high scanning rate. In this case, after the electronic device detects that the specific condition is met (for example, the light in an environment in which the electronic device is located is turned off), when the electronic device detects, for the first time, an operation of touching the screen by the user (for example, the user taps the screen for the first time after the light is turned on), the electronic device keeps a high hardware scanning rate unchanged.

In still another implementation, it is assumed that a specific condition is met, the hardware scanning rate of the electronic device is a high scanning rate, and the software scanning rate is a low scanning rate, for example, the scenario 3. In this case, when an operation of starting or switching an application is detected, and this operation is used for an application with a high scanning rate (for example, switching from a read application to a live application), the electronic device may switch the software scanning rate from a low scanning rate to a high scanning rate.

In still another implementation, it is assumed that a specific condition is met, the hardware scanning rate of the electronic device is a high scanning rate, and the software scanning rate is a high scanning rate, for example, the scenario 3. In this case, when an operation of starting or switching an application is detected, and this operation is used for an application with a low scanning rate (for example, switching from a live application to a read application), the electronic device may switch the software scanning rate from a high scanning rate to a low scanning rate.

In still another implementation, if the screen is off, after the electronic device detects that a specific condition is met (a light in a room in which the electronic device is located is turned off), the electronic device may set the hardware scanning rate to a high scanning rate. When the screen is on, the electronic device is displayed at the high hardware scanning rate.

In still another implementation, it is assumed that the electronic device meets a specific condition and both the hardware scanning rate and the software scanning rate are high scanning rates. In this case, if a touch operation of the user (for example, tap, slide, and double tap of the user on the screen) is not detected for a period of time, the electronic device may switch the software scanning rate to a low scanning rate. In this case, when detecting the touch operation, the electronic device may switch the software scanning rate to a high scanning rate.

In still another implementation, it is assumed that a specific condition is met, the hardware scanning rate of the electronic device is a high scanning rate, and the software scanning rate is a low scanning rate, for example, the scenario 1. In this case, when detecting an operation of setting the scanning rate of the screen to a high scanning rate, the electronic device may switch the software scanning rate from a low scanning rate to a high scanning rate.

In still another implementation, it is assumed that a specific condition is met, the hardware scanning rate of the electronic device is a high scanning rate, and the software scanning rate is a high scanning rate, for example, the scenario 1. In this case, when detecting an operation of setting the scanning rate of the screen to a low scanning rate, the electronic device may switch the software scanning rate from a high scanning rate to a low scanning rate.

It should be understood that the foregoing cases are merely examples for description. For more cases, refer to descriptions in steps S202, S304, S403, S405, S407, and S603. Details are not described.

S103: The electronic device does not enable the software scanning rate adjustment function.

When the electronic device needs to adjust the screen scanning rate, the electronic device may adjust both the hardware scanning rate and the software scanning rate.

For example, when the current hardware scanning rate is 60 Hz and the target scanning rate is 120 Hz, both the hardware scanning rate and the software scanning rate are immediately switched to 120 Hz.

It should be understood that, when the target scanning rate is reached by using a method different from the method for switching only the software scanning rate, the hardware scanning rate may be switched to the target scanning rate. However, to limit a frequency of switching the hardware scanning rate, so that switching is not performed frequently, a switching condition may be added, so as to ensure that a frequency of hardware switching is within a specific range. This reduces a quantity of switching times of the hardware scanning rate, further reduces a quantity of flashes, and improves user experience. In addition, when detecting that the electronic device is in a dark light condition, the electronic device may immediately switch the hardware scanning rate to a high scanning rate. In this case, because the hardware scanning rate has been increased, the hardware scanning rate may be prevented from being switched again in this dark condition, so that a quantity of sudden changes in the screen brightness can be further reduced, and user experience can be improved. Because a quantity of switching times of the scanning rate is reduced, fluency of the screen can be improved.

All or some of the foregoing embodiments may be implemented by using software, hardware, firmware, or any combination thereof.

In this application, the electronic device may be a terminal device, and has a display function. A type of the electronic device is not specifically limited. In some embodiments, the electronic device in embodiments of this application may be a portable device such as a mobile phone, a wearable device (for example, a smart band), a tablet computer, a laptop computer (laptop), a handheld computer, a computer, a ultra-mobile personal computer (ultra-mobile personal computer, UMPC), a cellular phone, a personal digital assistant (personal digital assistant, PDA), or an augmented reality (augmented reality, AR)/virtual reality (virtual reality, VR) device. The electronic device may alternatively be a device such as a television set, a vehicle-mounted device, or a projector. An example embodiment of the electronic device includes but is not limited to an electronic device mounted with iOS®, Android®, Microsoft®, or another operating system.

Figure 10:
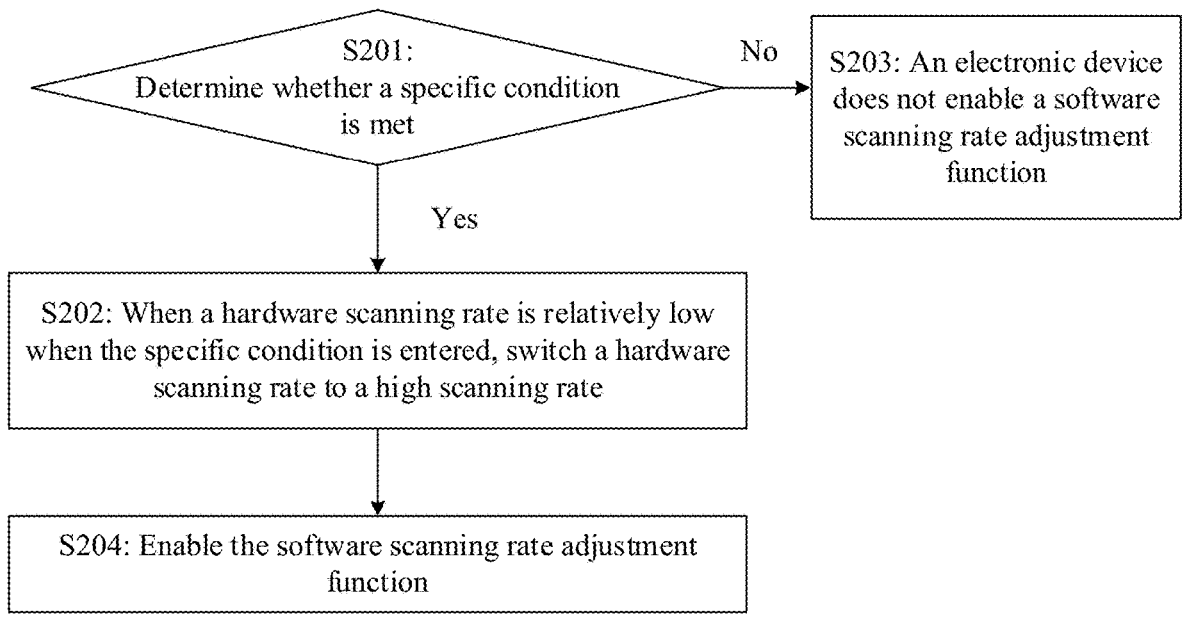
FIG. 10 is a schematic flowchart of another display method according to an embodiment of this application.

The following describes in detail a display method disclosed in embodiments of this application by using an embodiment in FIG. 10.

In embodiments, when an electronic device determines that a specific condition is met, and a hardware scanning rate is a low scanning rate, the electronic device may switch the hardware scanning rate to a high scanning rate in advance.

S201: The electronic device determines whether a specific condition is met, and if yes, performs step S202, or otherwise, performs step S203.

For step S201, refer to step S101. Details are not described again.

S202: When a hardware scanning rate is relatively low when the specific condition is entered, switch a hardware scanning rate to a high scanning rate.

The electronic device may switch both the hardware scanning rate and a software scanning rate to high scanning rates, or may switch the hardware scanning rate to a high scanning rate, and keep the software scanning rate unchanged.

In some embodiments, when the hardware scanning rate is relatively low when the specific condition is met, the electronic device may switch the hardware scanning rate and the software scanning rate to a high scanning rate. In this case, a scanning rate of the electronic device is equal to the hardware scanning rate and the software scanning rate of the electronic device. For example, both the current hardware scanning rate and the software scanning rate of the electronic device are 60 Hz, and when it is detected that the specific condition is met, the electronic device may switch both the hardware scanning rate and the software scanning rate to 120 Hz.

In some other embodiments, when the hardware scanning rate is relatively low when the specific condition is met, the electronic device may switch the hardware scanning rate to a high scanning rate, and keep the software scanning rate unchanged. For example, the current hardware scanning rate and a software scanning rate of the electronic device are 60 Hz. When the electronic device detects that the specific condition is met, the electronic device may switch the hardware scanning rate to 120 Hz, and keep the software scanning rate unchanged at 60 Hz.

When the electronic device detects that the specific condition is met, the electronic device may determine whether the hardware scanning rate is relatively low. When the hardware scanning rate is relatively low, the electronic device switches the hardware scanning rate. Otherwise, the electronic device does not switch the hardware scanning rate.

In some embodiments, the electronic device may determine whether an initial hardware scanning rate is greater than or equal to a third threshold when the specific condition is met. When the initial hardware scanning rate is greater than the third threshold, the electronic device may keep the hardware scanning rate unchanged. Otherwise, the electronic device switches the hardware scanning rate to a high scanning rate. The third threshold is not limited. For example, when the third threshold is 120 Hz, the hardware scanning rate of the electronic device is 60 Hz, and a dark light environment is entered from a bright light environment, (120>60), it may be determined that the hardware scanning rate of the electronic device enters a specific condition from a high scanning rate. When the third threshold is 120 Hz, the hardware scanning rate of the electronic device is 120 Hz, and screen brightness is from bright to dark, (120=120), it may be determined that the hardware scanning rate of the electronic device meets a specific condition from a low scanning rate. For example, when the specific condition is met, the electronic device may switch the hardware scanning rate to a high scanning rate based on the current scanning rate of the electronic device.

In some other embodiments, the electronic device may switch the hardware scanning rate based on a gear of the scanning rate. For example, the current hardware scanning rate ranges from 60 Hz to 120 Hz. When the hardware scanning rate is 60 Hz, the hardware scanning rate is switched to a high scanning rate: 120 Hz.

The following describes, by using several possible cases, an operation of switching the hardware scanning rate in advance by the electronic device.

In a possible case, in the scenario 2, when a user operates a screen of the electronic device (both the current hardware scanning rate and the software scanning rate of the electronic device are 120 Hz), and a light in an environment in which the electronic device is located is turned off (the electronic device enters a specific condition), the electronic device may maintain the current hardware scanning rate at 120 Hz.

In another possible case, the user watches a video by using the electronic device. In this case, the hardware scanning rate is 60 Hz, and the software scanning rate is also 60 Hz (low scanning rate). When a current location of the electronic device is determined as a cinema (when the user walks into the cinema while reading a novel, the electronic device changes from not meeting a specific condition to meeting the specific condition), the electronic device may switch the current hardware scanning rate to a high scanning rate: 120 Hz.

In still another possible case, when both the current hardware scanning rate and the software scanning rate of the electronic device are 60 Hz (low scanning rate), and the user dims brightness of a mobile phone (the electronic device changes from an unspecified condition to a specific condition), the electronic device may switch the current hardware scanning rate and the software scanning rate to a high scanning rate: 120 Hz.

In still another possible case, when a display of the electronic device is off, and it is determined that a specific condition is met, the electronic device may set the hardware scanning rate to a high scanning rate when the screen is on. For example, the high scanning rate is 120 Hz. In one case, when the electronic device is in a screen-off state, if it is detected that ambient light brightness or screen brightness is relatively dark, the hardware scanning rate may be set to a high scanning rate. When detecting a touch operation, the electronic device may be directly displayed at the specified high scanning rate. In another case, when the electronic device is in a screen-on state, and the hardware scanning rate is a high scanning rate, it is detected that ambient light brightness or screen brightness is relatively dark. After it is detected that the user does not perform a touch operation for a period of time (or another operation for which a user scanning rate needs to be decreased, for example, an operation for which a screen scanning rate to a low scanning rate and an operation performed on an application of switching or starting a low scanning rate), the electronic device may keep the hardware scanning rate unchanged at a high scanning rate.

It should be noted that the foregoing description is merely an example, and does not constitute a limitation. For more cases, refer to related descriptions in steps S102, S304, S403, S405, S407, and S603. Details are not described.

S203: The electronic device does not enable a software scanning rate adjustment function.

For step S203, refer to step S103. Details are not described again.

S204: The electronic device enables the software scanning rate adjustment function.

For step S204, refer to step S102. Details are not described again.

Figure 11:
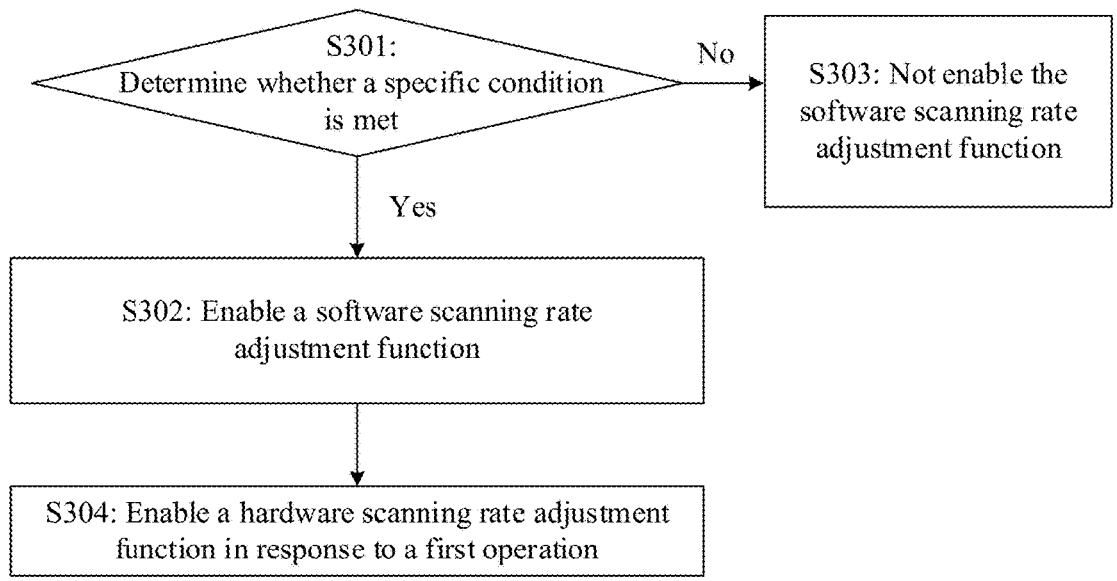
FIG. 11 is a schematic flowchart of still another display method according to an embodiment of this application.

The following describes in detail a display method disclosed in embodiments of this application by using an embodiment in FIG. 11.

In embodiments, when an electronic device detects that the electronic device is in a specific condition, and a hardware scanning rate is a low scanning rate, the electronic device does not switch the hardware scanning rate to a high scanning rate in advance, but determines, based on a user operation, whether to switch the hardware scanning rate to a high scanning rate.

S301: The electronic device determines whether a specific condition is met, and if yes, performs step S302, or otherwise, performs step S303.

For step S301, refer to step S101. Details are not described again.

S302: The electronic device enables a software scanning rate adjustment function.

For step S302, refer to step S102. Details are not described again.

S303: The electronic device does not enable the software scanning rate adjustment function.

For step S303, refer to step S103. Details are not described again.

S304: The electronic device enables a hardware scanning rate adjustment function in response to a first operation.

The first operation may be a user operation in the foregoing scenario. To be specific, the first operation may be an operation of actively switching a scanning rate by a user in the scenario 1, or may be an operation of touching a screen by a user in the scenario 2, or may be an operation of switching an application by a user in the scenario 3. Another operation may be required. This is not limited herein.

Implementation 1: The electronic device switches a hardware scanning rate based on an application.

As described in the scenario 3, when the electronic device detects an operation of switching an application, the electronic device may determine, based on an application obtained after the switching, whether to switch the hardware scanning rate to a hardware scanning rate corresponding to the application. The hardware scanning rate corresponding to the application is greater than the current hardware scanning rate. For example, when switching from read (60 Hz) hardware to a ticket grab application (such as 12306), the electronic device may switch the hardware scanning rate to a high scanning rate: 120 Hz. When switching from read (60 Hz) hardware to a live application (120 Hz), the electronic device may keep the hardware scanning rate unchanged at 60 Hz.

Implementation 2: The electronic device switches a hardware scanning rate based on a touch operation.

When detecting the touch operation performed on the screen (scenario 2), the electronic device may switch the hardware scanning rate based on a specific operation. For example, when detecting an operation of tapping an image control by the user, to open an application, the electronic device may keep the current hardware scanning rate unchanged. When detecting an operation of performing pull-down on a page by the user, the electronic device may switch the current hardware scanning rate from a low scanning rate to a high scanning rate.

Implementation 3: The electronic device switches a hardware scanning rate based on a priority of a scanning rate switching scenario.

The electronic device may first establish a mapping relationship between priorities of different scanning rate switching scenarios, and then determine a corresponding priority of a specific switching scenario, to determine, based on the priority, whether to switch the hardware scanning rate. For example, in the scenario 1, the electronic device detects that an operation of switching a screen scanning rate may be used as a high-priority scenario. In the scenario 3, the electronic device detects that an operation of switching an application may be used as a low-priority scenario. Therefore, when the hardware scanning rate of the electronic device is a low scanning rate, the electronic device may switch the hardware scanning rate to a high scanning rate in response to an operation of switching the hardware scanning rate to a high scanning rate. When the hardware scanning rate of the electronic device is a low scanning rate, the electronic device may keep the hardware scanning rate unchanged in response to an operation of switching an application.

It should be understood that the foregoing process of determining whether the hardware scanning rate needs to be switched is performed when the scanning rate of the electronic device needs to be switched. The foregoing description is merely an example, and does not constitute a limitation. For more cases, refer to related descriptions in steps S102, S202, S403, S405, S407, and S603. Details are not described.

Figure 12:
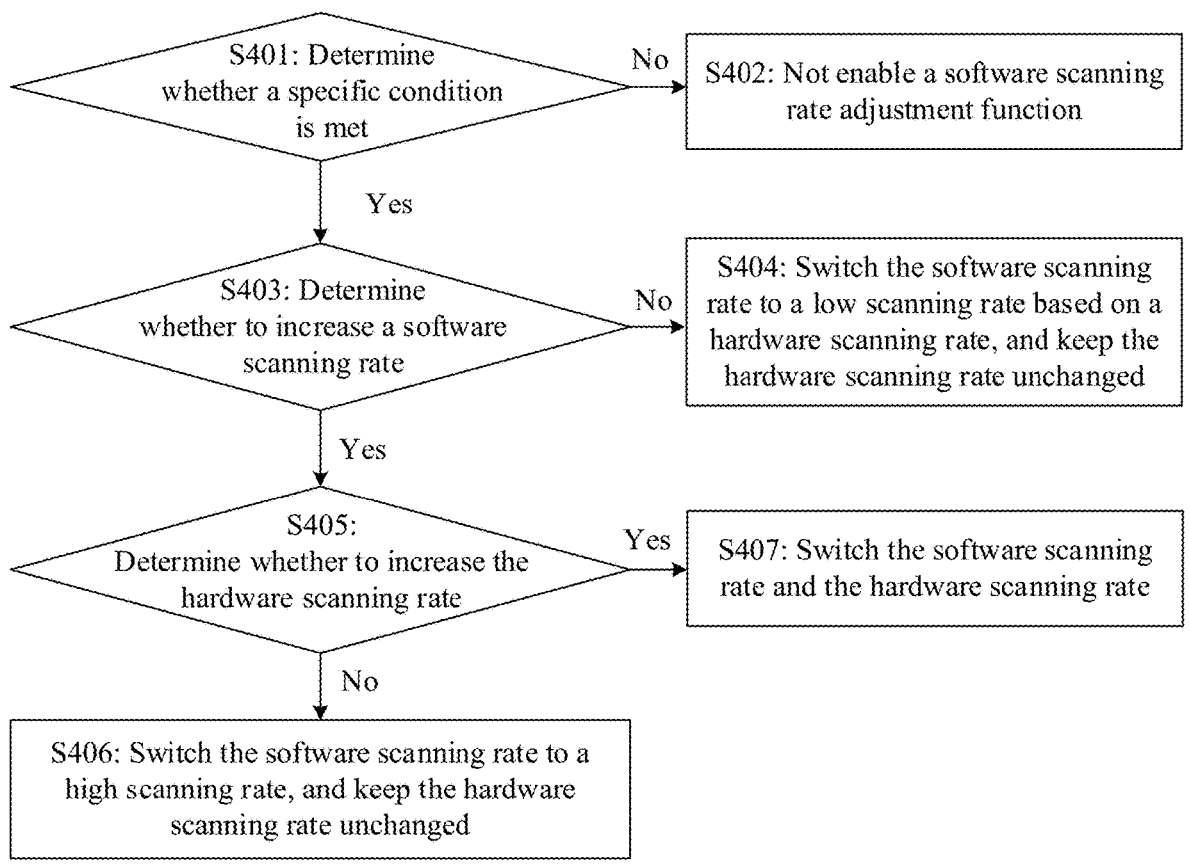
FIG. 12 is a schematic flowchart of still another display method according to an embodiment of this application.

The following describes in detail a display method disclosed in embodiments of this application by using an embodiment in FIG. 12.

S401: An electronic device determines whether a specific condition is met, and if yes, enables a software scanning rate adjustment function, that is, performs step S403, or otherwise, performs step S402.

For step S401, refer to step S101. Details are not described again.

S402: The electronic device does not enable a software scanning rate adjustment function.

When the electronic device does not meet the specific condition, the electronic device may normally switch a scanning rate, that is, the electronic device may perform switching according to an existing method for switching a scanning rate. That is, when the electronic device needs to switch the scanning rate, the electronic device may switch both a hardware scanning rate and a software scanning rate based on a user operation. In this case, the electronic device does not limit switching of the scanning rate.

For step S402, refer to step S103. Details are not described again.

S403: The electronic device determines whether to increase the software scanning rate, and if yes, performs S404, or otherwise, performs S405.

In an implementation, the electronic device may determine, based on a current user operation, whether to increase the software scanning rate. For the user operation, refer to related content in the foregoing scenarios 1, 2, and 3. When detecting an operation of switching the software scanning rate to a high scanning rate, the electronic device may determine to increase the software scanning rate.

In another implementation, the electronic device may receive a switching instruction, and the switching instruction may instruct to increase the software scanning rate. For example, an identifier "01" indicates to increase the software scanning rate, an identifier "10" indicates to decrease the software scanning rate, and an identifier "00" indicates to maintain the software scanning rate. In response to the switching instruction, the electronic device may determine, based on the identifier of the switching instruction, whether to increase the software scanning rate, or whether to decrease the software scanning rate.

In still another implementation, the electronic device may switch the software scanning rate based on a target scanning rate. When the target scanning rate is greater than the current software scanning rate, it may be determined that the switching instruction instructs to increase the software scanning rate. When the target scanning rate is less than the current software scanning rate, it may be determined that the switching instruction instructs to decrease the software scanning rate. When the target scanning rate is equal to the current software scanning rate, it may be determined that the switching instruction instructs to keep the software scanning rate unchanged.

The foregoing cases are merely examples for description. For more cases, refer to related descriptions in steps S102, S202, S304, S405, S407, and S603. Details are not described.

S404: The electronic device switches the software scanning rate to a low scanning rate according to the hardware scanning rate, and keeps the hardware scanning rate unchanged.

For details of step S404, refer to descriptions of step S102. Details are not described again.

In a specific condition, when the electronic device needs to switch the software scanning rate to a low scanning rate, the electronic device may switch the software scanning rate, and keep the hardware scanning rate unchanged. Changes in screen brightness of the electronic device can be avoided, and user experience can be improved.

S405: The electronic device determines whether to switch the hardware scanning rate to a high scanning rate, and if yes, performs S406, or otherwise, performs S407.

In an implementation, when the electronic device determines to switch the hardware scanning rate of the electronic device to a high scanning rate, the electronic device may determine whether the hardware scanning rate is not less than the target scanning rate. When a value of the hardware scanning rate is greater than or equal to (not less than) a value of the target scanning rate, the electronic device may determine that the current hardware scanning rate can meet a scanning rate switching requirement, and perform step S406. When a value of a first scanning rate is less than the value of the target scanning rate, the electronic device may determine that the current hardware scanning rate does not meet the scanning rate requirement, and perform step S407.

In another implementation, the electronic device may enable a hardware scanning rate adjustment function in response to a first operation. For details, refer to descriptions of step S304. Details are not described again.

The foregoing examples describe several possibilities. For more cases, refer to related descriptions in steps S102, S202, S304, S403, S407, and S603. Details are not described.

S406: The electronic device switches the software scanning rate to a high scanning rate, and keeps the hardware scanning rate unchanged.

For details of step S406, refer to related descriptions of step S102. Details are not described again.

S407: The electronic device switches the software scanning rate and the hardware scanning rate.

For a process in which the electronic device switches the hardware scanning rate and the software scanning rate, refer to step S103.

In an implementation, the electronic device may determine whether a quantity of switching times of the hardware scanning rate at a third time interval is greater than a third threshold in a specific condition. If yes, the electronic device may keep both the software scanning rate and the hardware scanning rate unchanged. Otherwise, the electronic device may switch the software scanning rate and the hardware scanning rate. The third time interval may be a time interval of a specific time length closest to the electronic device, and the third time interval may be, for example, 10 s or 20 s. The third threshold may be a threshold at which the electronic device may determine a quantity of switching times of the hardware scanning rate in a dark light condition, for example, 10 times. Specifically, when the electronic device detects a user operation (one or more of the operations in the scenarios 1, 2, and 3), both the software scanning rate and the hardware scanning rate are 60 Hz. In the third time interval, the electronic device performs switching four times in a specific condition, and the third threshold is 5 (4<5). In this case, the electronic device may switch both the software scanning rate and the hardware scanning rate to 120 Hz.

It should be noted that the foregoing third threshold is intended to limit the electronic device not to frequently perform switching in the specific condition, and a specific value of the foregoing third threshold is not limited. For more cases, refer to related descriptions in steps S102, S202, S304, S403, S407, and S603. Details are not described.

Figure 13:
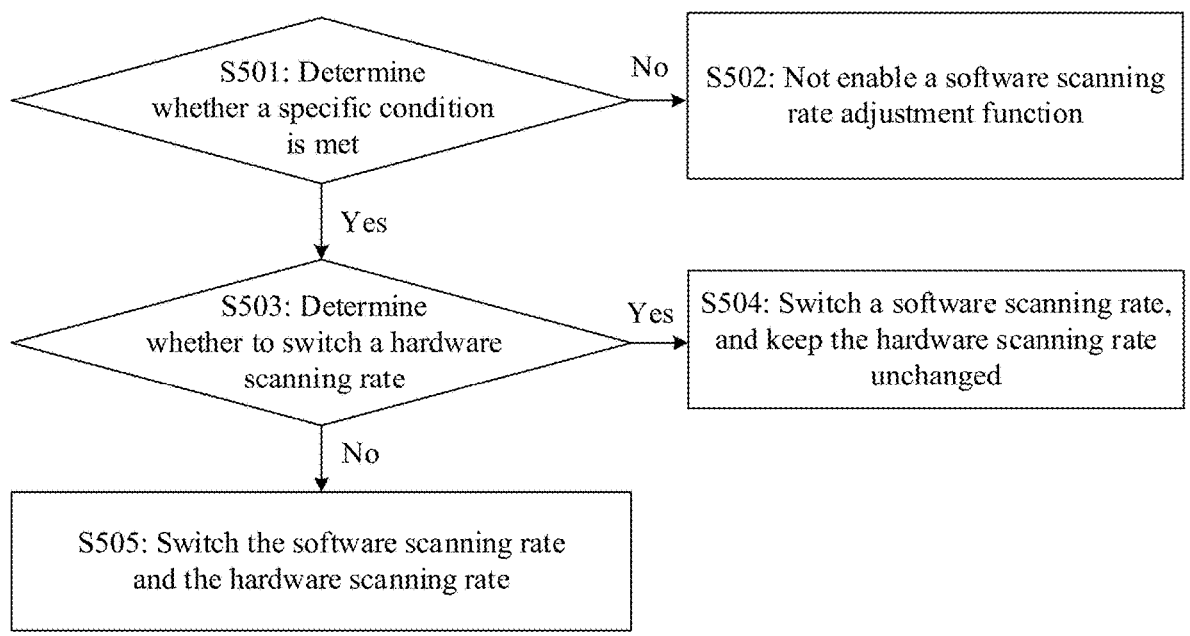
FIG. 13 is a schematic flowchart of still another display method according to an embodiment of this application.

The following describes in detail a display method disclosed in embodiments of this application by using an embodiment in FIG. 13.

S501: An electronic device determines whether a specific condition is met, and if yes, enables a software scanning rate adjustment function, that is, performs step S503, or otherwise, performs step S502.

For step S501, refer to step S101. Details are not described again.

Optionally, when determining whether the specific condition is met, the electronic device may switch a hardware scanning rate to a high scanning rate. For details, refer to descriptions of step S202 in FIG. 10. Details are not described again.

S502: The electronic device does not enable the software scanning rate adjustment function.

For step S502, refer to step S103. Details are not described again.

S503: The electronic device determines whether to switch the hardware scanning rate, and if yes, performs step S504, or otherwise, performs step S505.

For step S503, refer to step S304 and step S405. Details are not described again.

S504: The electronic device switches a software scanning rate, and keeps the hardware scanning rate unchanged.

For step S504, refer to step S102 and step S406. Details are not described again.

S505: The electronic device switches the software scanning rate and the hardware scanning rate.

For step S505, refer to step S103 and step S407. Details are not described again.

Figure 14:
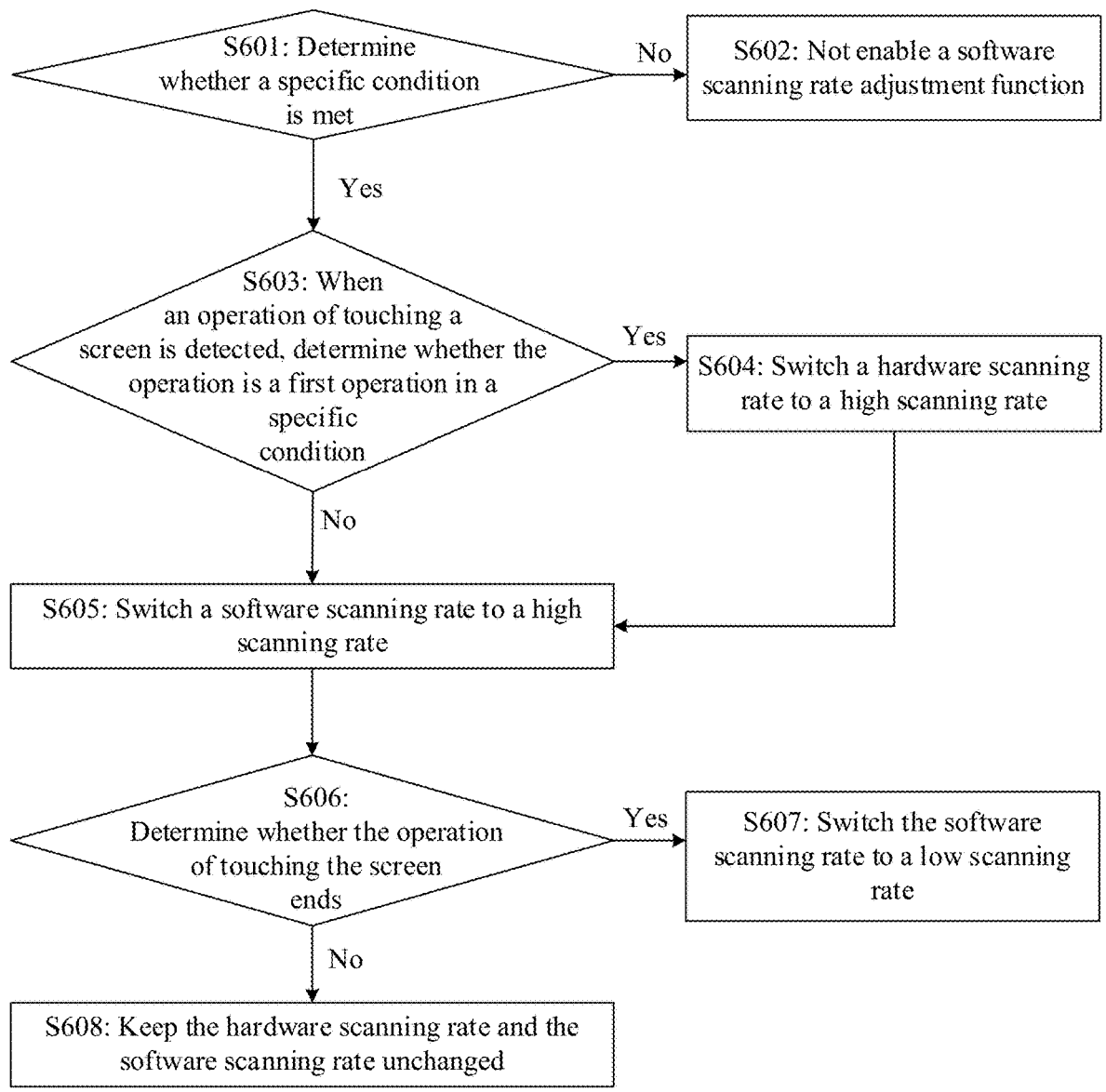
FIG. 14 is a schematic flowchart of still another display method according to an embodiment of this application.

The following describes in detail a display method disclosed in embodiments of this application by using an embodiment in FIG. 14.

S601: An electronic device determines whether a specific condition is met, and if yes, enables a software scanning rate adjustment function, that is, performs S603, or otherwise, does not enable the software scanning rate adjustment function, that is, performs S602.

For step S601, refer to step S101. Details are not described again.

S602: The electronic device does not enable the software scanning rate adjustment function.

For step S602, refer to step S103. Details are not described again.

S603: When detecting an operation of touching a screen, the electronic device determines whether the operation is a first operation in the specific condition, and if yes, performs S604, or otherwise, performs S605.

When the user touches the screen of the electronic device (scenario 2), the electronic device may detect the operation of touching the screen, and then the electronic device may determine whether the operation is the first operation in the specific condition. The first operation is an operation in which the electronic device detects the touch screen for the first time in this dark condition.

The following describes several possible cases after the software scanning rate adjustment function is enabled:

In some embodiments, before the software scanning rate adjustment function is enabled, a hardware scanning rate of the electronic device is a low scanning rate, and when a light in a room in which the electronic device is located is turned off, the electronic device changes from not meeting the specific condition to meeting the specific condition. When the electronic device detects the operation of touching the screen by the user, the electronic device may switch the hardware scanning rate from a low scanning rate to a high scanning rate, and also switch a software scanning rate to a high scanning rate. Then, if the electronic device detects, after a first time, no operation of touching the screen by the user, the electronic device may switch the software scanning rate from a high scanning rate to a low scanning rate. Subsequently, the user taps the screen, and the electronic device detects the touch operation of tapping the screen. The electronic device may switch the software scanning rate from a low scanning rate to a high scanning rate.

In some other embodiments, before the software scanning rate adjustment function is enabled, a hardware scanning rate is a high scanning rate, and when a light in a room in which the electronic device is located is turned off, the electronic device changes from not meeting the specific condition to meeting the specific condition. When the electronic device detects the operation of touching the screen by the user, the electronic device may keep the hardware scanning rate and a software scanning rate unchanged. Then, if the electronic device detects, after a first time, no operation of touching the screen by the user, the electronic device may switch the software scanning rate from a high scanning rate to a low scanning rate. Subsequently, the user taps the screen, and the electronic device detects the touch operation of tapping the screen. The electronic device may switch the software scanning rate from a low scanning rate to a high scanning rate.

In some other embodiments, when the electronic device does not meet the specific condition, a light in a room in which the electronic device is located is turned off (from not meeting the specific condition to meeting the specific condition) when the user browses a social application. In this case, when the electronic device detects an operation of switching from a social application (low scanning rate) to a live application (high scanning rate) by the user, to ensure page fluency, the electronic device may keep the hardware scanning rate unchanged, and switch a software scanning rate to a high scanning rate. When the electronic device detects an operation of switching back to the social application from the live application, because the live application is running, to improve user experience, the electronic device may keep the software scanning rate and the hardware scanning rate unchanged.

It should be understood that the foregoing cases are merely examples for description. For more cases, refer to related descriptions in steps S102, S202, S304, S403, S405, and S407. Details are not described again.

S604: The electronic device switches the hardware scanning rate to a high scanning rate.

In an implementation, the electronic device switches the hardware scanning rate to a high scanning rate, and keeps the software scanning rate unchanged.

In another implementation, the electronic device switches both the hardware scanning rate and the software scanning rate to high scanning rates.

For step S604, refer to content of switching the hardware scanning rate in steps S202 and S304. Details are not described again.

S605: The electronic device switches the software scanning rate to a high scanning rate.

For step S605, refer to step S102. Details are not described again.

S606: The electronic device determines whether the operation of touching the screen ends, and if yes, performs S607, or otherwise, performs S608.

In an implementation, when the electronic device does not detect the foregoing operation of touching the screen (scenario 2), the electronic device may determine that the operation of touching the screen ends. When the electronic device detects the foregoing operation of touching the screen, the electronic device may determine that the operation of touching the screen does not end.

In another implementation, when an application running on the electronic device includes an application with a high scanning rate, if the user touches an operation of ending running of the application with the high scanning rate, the electronic device may determine that the operation of touching the screen ends. For example, when an application running on the electronic device includes a social application (low scanning rate) and a game application (high scanning rate), the user taps an operation of ending the game application, that is, the electronic device may determine that the operation of touching the screen ends. It should be understood that, in this case, an application running on the electronic device may include an application with a low scanning rate, or may not include an application with a low scanning rate.

S607: The electronic device switches the software scanning rate to a low scanning rate.

In an implementation, when an operation of touching the screen in the S606 ends, the electronic device may maintain the current hardware scanning rate and the software scanning rate at a fourth time interval. The fourth time interval may be fixed, or may be changed. The electronic device may set a time length to the fourth time interval, for example, 2 s, 4 s, or 5 s. The electronic device may further determine the fourth time interval based on a specific operation of touching the screen. For example, when the operation is a touch operation such as a tap operation, the electronic device may determine that the fourth time interval is 2 s. When the operation is a touch operation such as an underscore list or text, the electronic device may determine that the fourth time interval is 5 s. The foregoing description is merely an example of lengths of different fourth time intervals, and does not constitute a limitation. After the fourth time interval, the electronic device may switch the software scanning rate to a low scanning rate based on the hardware scanning rate, and keep the hardware scanning rate unchanged.

For details of switching the software scanning rate to a low scanning rate in step S607, refer to step S102. Details are not described again.

S608: The electronic device keeps the hardware scanning rate and the software scanning rate unchanged.

When the user operation in S606 does not end, the electronic device may keep the current hardware scanning rate and the software scanning rate unchanged.

When the electronic device is in a non-dark light condition, and the electronic device switches the hardware scanning rate, a change in screen brightness is basically not perceived by a human eye. Therefore, when the electronic device switches a value of a first scanning rate, visual experience of the human eye is basically not affected. In this case, the electronic device may not limit switching of the first scanning rate. The electronic device may switch the value of the first scanning rate and a value of a second scanning rate to low scanning rates, to reduce energy consumption, or may freely switch the value of the first scanning rate and a value of a second scanning rate to high scanning rates, to improve user experience.

When the electronic device is in a dark light condition, and the electronic device switches the hardware scanning rate, a change in screen brightness can be perceived by a human eye. Therefore, when the electronic device switches a first scanning rate, visual experience of the human eye is affected. In this case, the electronic device needs to limit switching of the first scanning rate. Further, to reduce energy consumption, when the electronic device needs to switch the scanning rate to a low scanning rate, the electronic device may keep the first scanning rate unchanged, and switch the second scanning rate to a low scanning rate.

Figure 15:
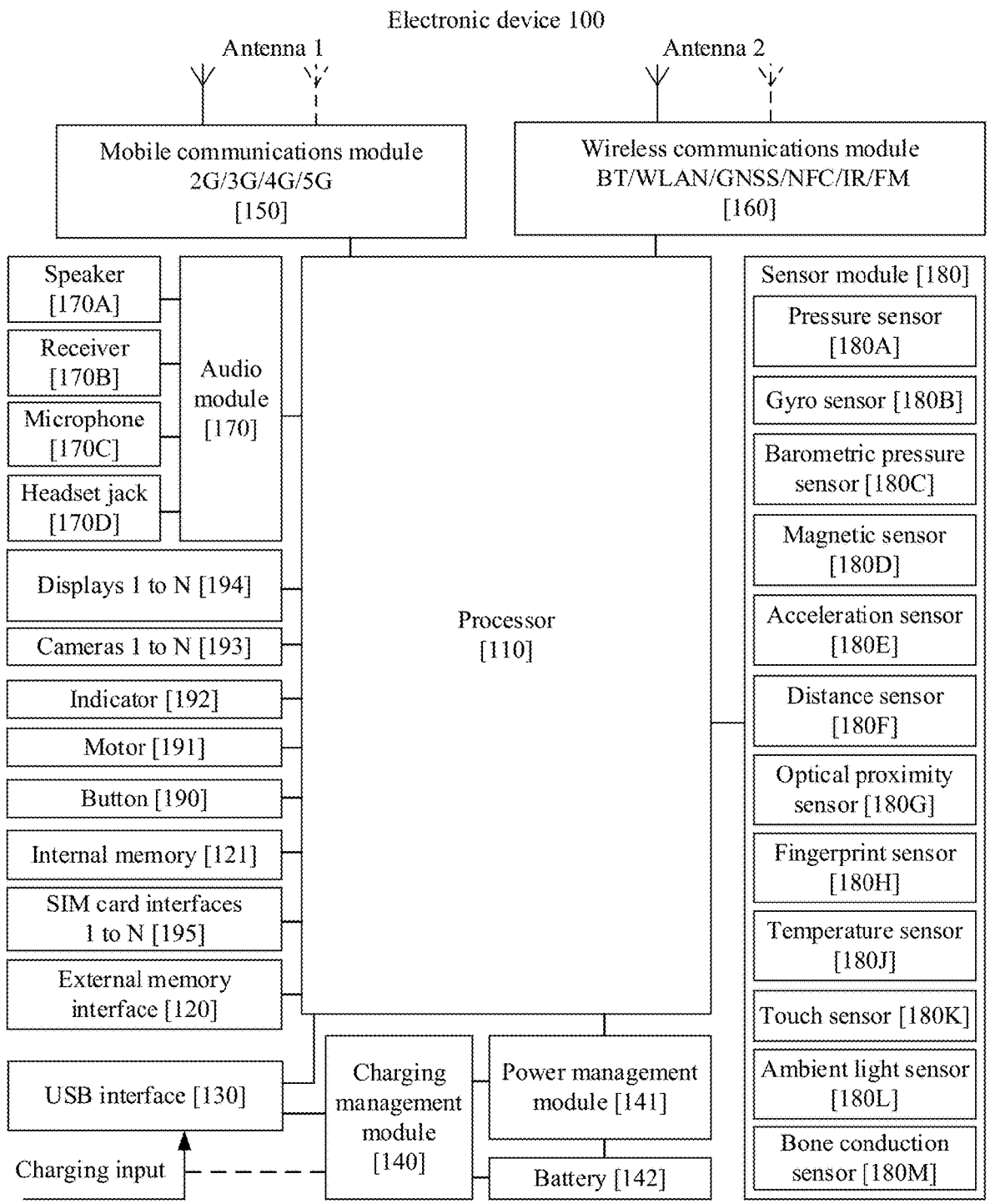
FIG. 15 is a schematic diagram of a structure of hardware according to an embodiment of this application.

FIG. 15 shows a schematic diagram of a structure of an electronic device 100.

The following specifically describes embodiments by using the electronic device 100 as an example. It should be understood that the electronic device 100 shown in FIG. 15 is merely an example, and the electronic device 100 may have more or fewer components than that shown in FIG. 11, or may combine two or more components, or may have different component configurations. The various components shown in the figure may be implemented in hardware, software, or a combination of hardware and software including one or more signal processors and/or application-specific integrated circuits.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or used cyclically by the processor 110. If the processor 110 needs to use the instructions or the data again, the processor 110 may directly invoke the instructions or the data from the memory, to avoid repeated access, and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, thereby implementing a touch function of the electronic device 100.

The I2S interface may be configured to perform audio communication. In some embodiments, the processor 110 may include a plurality of groups of I2C buses. The processor 110 may be coupled to the audio module 170 by using the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and encode an analog signal. In some embodiments, the audio module 170 may be coupled to the wireless communications module 160 through the PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through UART interface, to implement a function of playing music by using a Bluetooth headset.

The MIPI interface may be configured to connect the processor 110 to a peripheral component such as the display 194 and the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, and the like. The GPIO interface may also be configured as the I2C interface, the I2S interface, the UART interface, the MIPI interface, or the like.

The USB interface 130 is an interface that conforms to a USB standard specification, and may be specifically a mini-USB interface, a micro-USB interface, a USB type-C interface, or the like. The USB interface 130 may be configured to connect to the charger to charge the electronic device 100, or may be configured to transmit data between the electronic device 100 and a peripheral device, or may be configured to connect to a headset and play audio by using the headset. The interface may be further configured to connect to another electronic device such as an AR device.

It may be understood that an interface connection relationship between the modules that is shown in embodiments of this application is merely an example for description, and does not constitute a limitation on a structure of the electronic device 100. In some other embodiments, the electronic device 100 may alternatively use an interface connection manner different from that in the foregoing embodiment, or a combination of a plurality of interface connection manners.

The charging management module 140 is configured to receive a charging input from the charger. The charger may be a wireless charger, or may be a wired charger. In some embodiments of wired charging, the charging management module 140 may receive a charging input of the wired charger through the USB interface 130. In some embodiments of wireless charging, the charging management module 140 may receive a wireless charging input by using a wireless charging coil of the electronic device 100. The charging management module 140 may further supply power to the electronic device through the power management module 141 while charging the battery 142.

The power management module 141 is configured to connect the battery 142 and the charging management module 140 to the processor 110. The power management module 141 receives an input of the battery 142 and/or an input of the charging management module 140, and supplies power to the processor 110, the internal memory 121, an external memory, the display 194, the camera 193, and the wireless communications module 160. The power management module 141 may further monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communications module 150 may provide a solution, applied to the electronic device 100, to wireless communication including 2G/3G/4G/5G and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and send a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (wireless local area networks, WLAN) (such as a wireless fidelity (wireless fidelity, Wi-Fi) network), Bluetooth (Bluetooth, BT), global navigation satellite system (global navigation satellite system, GNSS), frequency modulation (frequency modulation, FM), near field communication (near field communication, NFC), an infrared (infrared, IR) technology, and the like. The wireless communications module 160 may be one or more components integrating at least one communications processor module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communications module 150, and the antenna 2 is coupled to the wireless communications module 160, so that the electronic device 100 can communicate with a network and other devices by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The electronic device 100 implements a display function through the GPU, the display 194, the application processor, and the like. The GPU is a microprocessor for image processing, and is connected to the display 194 and the application processor. The GPU is configured to perform mathematical and geometric calculation and perform graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An object generates an optical image through the lens and projects the optical image to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal. In addition to a digital image signal, the digital signal processor may also process another digital signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG)1, MPEG2, MPEG3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external storage card, such as a micro-SD card, to extend a storage capability of the electronic device 100. The external storage card communicates with the processor 110 through the external memory interface 120, to implement a data storage function. For example, a file such as music or a video is stored in the external storage card.

The internal memory 121 may be configured to store computer executable program code, where the executable program code includes instructions. The processor 110 executes various function applications and data processing of the electronic device 100 by running instructions stored in the internal memory 121. The internal memory 121 may include a program storage area and a data storage area. The program storage area may store an operating system, an application required by at least one function (for example, a sound play function or an image play function), and the like. The storage data area may store data (such as audio data or a phone book) created in a use process of the electronic device 100. In addition, the internal memory 121 may include a high-speed random access memory, and may further include a non-volatile memory, such as at least one disk storage device, a flash memory, or a universal flash storage (universal flash storage, UFS).

The electronic device 100 may implement an audio function such as music play or recording through the audio module 170, the speaker 170A, the receiver 170B, the microphone 170C, the headset jack 170D, an application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The electronic device 100 may be used to listen to music or answer a call in a hands-free mode through the speaker 170A.

The receiver 170B, also referred to as an "earpiece", is configured to convert an audio electrical signal into a sound signal. When the electronic device 100 is used to answer a call or listen to voice information, the receiver 170B may be put close to a human ear to listen to a voice.

The microphone 170C, also referred to as a "mike" or a "microphone", is configured to convert a sound signal into an electrical signal. When making a call or sending a voice message, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is performed. When a touch operation whose touch operation intensity is greater than or equal to the first pressure threshold is performed on the Messages application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, and calculates, based on the angle, a distance for which a lens module needs to be compensated, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip cover through the magnetic sensor 180D. In some embodiments, when the electronic device 100 is a clamshell phone, the electronic device 100 may detect opening and closing of a flip over based on the magnetic sensor 180D. Further, a feature such as automatic unlocking upon opening of the flip cover is set based on a detected opening or closing state of the flip cover.

The acceleration sensor 180E may detect magnitude of acceleration in various directions (generally on three axes) of the electronic device 100, and may detect magnitude and a direction of the gravity when the electronic device 100 is still. The acceleration sensor 180E may be further configured to identify a posture of the electronic device, and is applied to an application such as switching between landscape mode and portrait mode or a pedometer.

The distance sensor 180F is configured to measure a distance. The electronic device 100 may measure the distance in an infrared or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, through the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally because of a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation on or near the touch sensor 180K. The touch sensor may transfer the detected touch operation to the application processor to determine a touch event type. A visual output related to the touch operation may be provided by the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a human pulse to receive a blood pressure beating signal. In some embodiments, the bone conduction sensor 180M may alternatively be disposed in the headset, to obtain a bone conduction headset. The audio module 170 may parse out a speech signal through parsing based on the vibration signal that is of the vibration bone of the human vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The key 190 may be a mechanical key. May also be a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio play) may correspond to different vibration feedback effects. The motor 191 may also correspond to different vibration feedback effects for touch operations on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may be further compatible with an external storage card. The electronic device 100 interacts with a network by using the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

Figure 16:
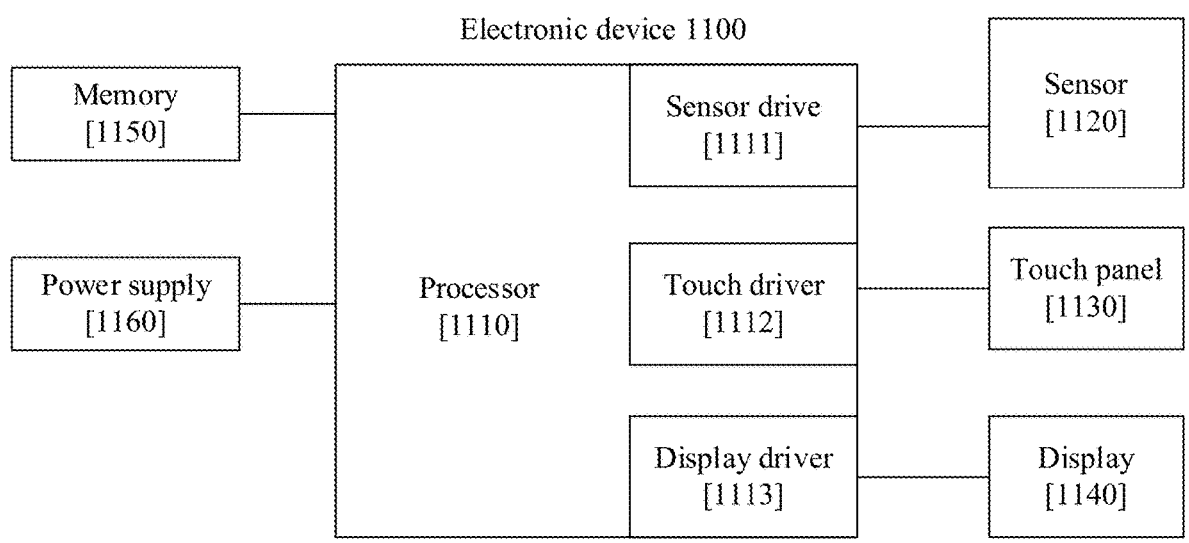
FIG. 16 is a schematic diagram of a structure of another hardware according to an embodiment of this application.

FIG. 16 is a schematic diagram of a structure of another electronic device according to an embodiment of this application. As shown in FIG. 16, the electronic device 1100 includes a processor 1110, a sensor 1120, a touch panel 1130, and a display 1140. Optionally, the electronic device 1100 may further include a memory 1150 and a power supply 1160. The processor 1110 and the memory 1150 may communicate with each other by using an internal connection path, to transmit a control and/or data signal. The memory 1150 is configured to store a computer program, and the processor 1110 is configured to invoke and run the computer program from the memory 1150. The display 1140 may include a display, and the touch panel 1130 may include a touchscreen.

The processor 1110 and the memory 1150 may be combined into a processing apparatus, and more commonly, are independent of each other. The processor 1110 is configured to execute program code stored in the memory 1150 to implement the foregoing functions. During specific implementation, the memory 1150 may be integrated into the processor 1110, or is independent of the processor 1110.

Optionally, the power supply 1160 is configured to supply power to the foregoing modules or components.

The processor 1110 may include modules such as a sensor driver 1111, a touch driver 1112, and a display driver 1113. The sensor driver 1111 is configured to drive the sensor 1120, and the sensor driver 1111 may receive ambient light brightness from the sensor 1120. The touch driver 1112 is configured to drive the touch panel 1130, and the touch driver 1112 may receive a touch operation from the touch panel 1130. The display driver 1113 is configured to drive the display 1140, and the display driver 1113 may receive screen brightness from the display 1140.

For the sensor 1120, refer to descriptions of the ambient light sensor in FIG. 14. For the touch panel, refer to descriptions of the touch sensor in FIG. 14. For the display, refer to descriptions of the display in FIG. 14. Details are not described.

For the memory 1150, refer to the memory corresponding to FIG. 14. Details are not described.

Figure 17:
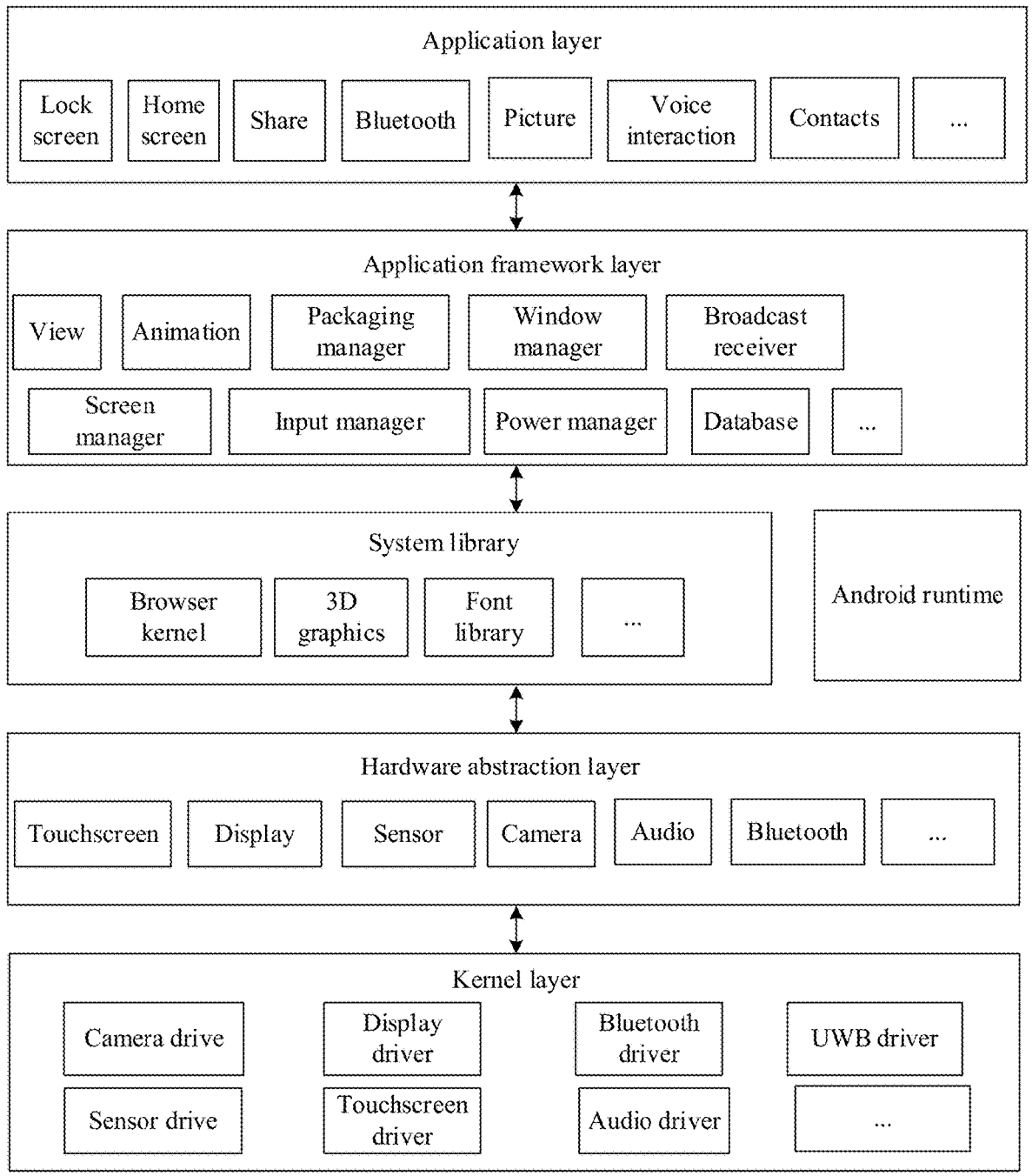
FIG. 17 is a schematic diagram of a structure of software according to an embodiment of this application.

FIG. 17 is a block diagram of a software structure of an electronic device according to an embodiment of this application.

As shown in FIG. 17, a software framework of the electronic device in this application may include an application layer, an application framework layer (framework, FWK), a system library, Android runtime, a hardware abstraction layer (hardware abstraction layer, HAL), and a kernel layer (kernel).

The application layer may include a series of application packages, such as a lock screen application, a desktop application, Share, Bluetooth, a voice interaction application, an address book, Gallery, a file manager, Browser, and Contacts. In this application, for the application of the application layer, refer to descriptions and specifications in the conventional technology. Details are not described in this application. In this application, an application on a portable device may be a native application (for example, an application installed on the portable device when an operating system is installed before the portable device is delivered from the factory), or may be a third-party application (for example, an application downloaded by a user from an application store). This is not limited in embodiments of this application.

The application framework layer provides an application programming interface (application programming interface, API) and a programming framework for the application of the application layer. As shown in FIG. 17, the application framework layer may include a window manager, a packaging management server, a view, an animation, a broadcast receiver, a power manager, a font manager, a database, an input manager, and a screen manager. In this application, the screen manager is configured to receive a touch event detected by a screen driver, and the input manager is configured to receive a key input event.

The system library and the Android runtime include a performance function that needs to be invoked by the FWK, an Android core library, and an Android virtual machine. The system library may include a plurality of function modules, for example, a browser kernel, a three-dimensional (3 dimensional, 3D) graph, and a font library.

The hardware abstraction layer is an abstraction interface driven by a device kernel, and is configured to provide an application programming interface for a higher-level Java API framework to access an underlying device. The HAL includes a plurality of library modules, such as a camera, a touchscreen, a sensor, a display, Bluetooth, and audio. Each library module implements one interface for a specific type of hardware component. When the system framework layer API requires access to the hardware of the portable device, the Android operating system loads the library module for the hardware component.

The kernel layer is a foundation of the Android operating system, and a final function of the Android operating system is implemented by using the kernel layer. The kernel layer may include a camera driver, a display driver, a Bluetooth driver, an ultra-wideband (Ultra Wideband, UWB) driver, an audio driver, a sensor driver, a touchscreen driver, and the like. For example, an interface language between the kernel layer and the hardware abstraction layer is a hardware abstraction layer interface definition language (HAL interface definition language, HIDL). The sensor driver is configured to collect ambient brightness data of the portable device, and the display driver is configured to collect screen brightness data of the portable device, so that a dark light condition in which the electronic device is located is detected. The touchscreen driver is configured to detect a touchscreen event. For a specific touchscreen event, refer to descriptions in the foregoing scenarios 1 to 3. Details are not described herein.

It should be noted that a schematic diagram of a software structure of the portable device shown in FIG. 17 in this application is merely an example, and a specific module division at different layers of the Android operating system is not limited. For details, refer to descriptions of a software structure of the Android operating system in the conventional technology. In addition, a display method of the electronic device provided in this application may alternatively be implemented based on another operating system, and no enumeration is provided in this application. The following embodiment describes, by using the software structure of the portable device with the structure shown in FIG. 17 as an example, the technical solutions provided in embodiments of this application.

Figure 18:
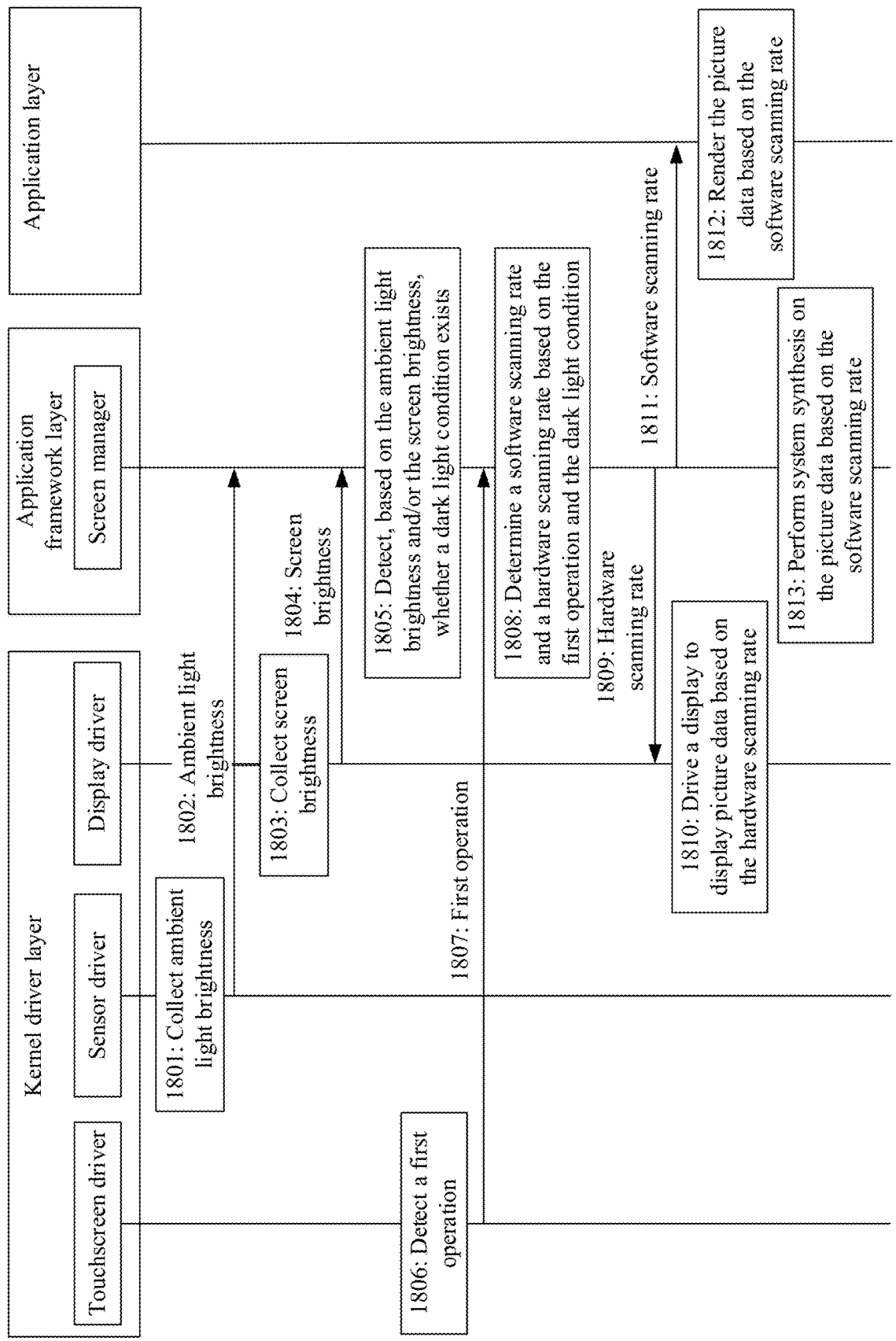
FIG. 18 is a schematic flowchart of still another display method according to an embodiment of this application.

With reference to the schematic diagram of the software framework of the electronic device shown in FIG. 17, FIG. 18 provides a schematic flowchart of a display method. The method may include step 1801 to step 1808.

The following describes the method by using a specific condition as a dark light condition.

1801: A sensor driver of a kernel driver layer collects ambient light brightness.

The sensor driver may drive a sensor (that is, the foregoing ambient light sensor) to obtain the ambient light brightness, and then the sensor driver obtains the foregoing ambient light brightness.

The sensor driver may periodically collect the ambient light brightness, for example, the sensor driver collects the ambient light brightness every two seconds.

1802: The sensor driver of the kernel driver layer sends the ambient light brightness to a screen manager of an application framework layer.

The sensor driver may collect the ambient light brightness. When the ambient light brightness changes, the sensor driver may send the detected ambient light brightness to the screen manager. Correspondingly, the screen manager may receive the ambient light brightness from the sensor driver.

1803: A display driver of the kernel driver layer collects screen brightness.

The display driver may periodically collect the screen brightness.

1804: The display driver of the kernel driver layer sends the screen brightness to the screen manager of the application framework layer.

The display driver may collect the screen brightness. When the screen brightness changes, the display driver may send the detected screen brightness to the screen manager. Correspondingly, the screen manager may receive the screen brightness from the display driver. For example, the display driver may detect that newly detected screen brightness is 120 nit, and previous screen brightness is 230 nit. The screen brightness obtained last time and the screen brightness obtained this time are different. Therefore, the display driver may send the screen brightness obtained this time: 120 nit to the screen manager of the application framework layer.

1805: The screen manager of the application framework layer determines, based on the ambient light brightness and/or the screen brightness, whether the electronic device is in a dark light condition.

For specific descriptions of step 1805, refer to S101. Details are not described.

1806: A touchscreen driver of the kernel driver layer detects a first operation.

The first operation may be an operation corresponding to the scenario 1, the scenario 2, or the scenario 3, and details are not described.

1807: The touchscreen driver of the kernel driver layer sends the first operation to the screen manager.

When detecting the first operation, the touchscreen driver may send the first operation to the screen manager.

1808: The screen manager determines a software scanning rate and a hardware scanning rate based on the first operation and the dark light condition.

For the first operation, refer to the user operation corresponding to the foregoing scenario. Details are not described.

In a bright light condition, the screen manager may commonly determine a software scanning rate and a hardware scanning rate.

In the dark light condition, the screen manager may determine the software scanning rate and the hardware scanning rate according to the corresponding methods in FIG. 8, FIG. 10, FIG. 11, FIG. 12, FIG. 13, and FIG. 14. For a specific determining method, refer to the foregoing descriptions. Details are not described.

1809: The screen manager sends the hardware scanning rate to the display driver.

After determining the current hardware scanning rate, the screen manager may directly send the hardware scanning rate to the display driver.

1810: The display driver drives a display to display image data according to the hardware scanning rate.

The display driver may drive the display to display (scan) the image data according to the hardware scanning rate.

1811: The screen manager sends the software scanning rate to an application layer.

After determining the current software scanning rate, the screen manager may directly send the software scanning rate to the application layer.

The screen manager may first determine application software corresponding to the software scanning rate, and then send the software scanning rate to application software corresponding to the application layer. The application software may be a video, a clock, a gallery, an application store, or the like.

1812: The application layer renders the image data according to the software scanning rate.

After receiving the software scanning rate, the application layer may process the image data based on the software scanning rate. That is, the application software may perform rendering, system synthesis, and display on the image data based on a frequency of the software scanning rate. For example, when a picture application receives the software scanning rate of 60 Hz, the picture application renders the image data at a frequency of 60 Hz.

1813: The screen manager performs system synthesis on the image data based on the software scanning rate.

The screen manager may include a system synthesizer. After receiving the software scanning rate, the system synthesizer may perform system synthesis on the image data based on the software scanning rate.

It should be understood that a sequence in which the screen manager performs step 1809, step 1811, and step 1813 is not limited.

For a specific method procedure corresponding to FIG. 18, refer to related descriptions in FIG. 8, FIG. 10, FIG. 11, FIG. 12, FIG. 13, and FIG. 14. Details are not described herein.

It may be understood that, to implement the functions of any one of the foregoing embodiments, the portable device includes a hardware structure and/or a software module corresponding to each function. A person skilled in the art should easily aware that, with reference to the units and method steps of the examples described in embodiments disclosed in this specification, this application can be implemented in a form of hardware or a combination of hardware and computer software. Whether a function is executed in a form of hardware or computer software—driven hardware depends on specific applications and design constraint conditions of the technical solutions. A person skilled in the art may use different methods for each specific application to implement the described functions, but this implementation should not be understood as being beyond the scope of this application.

In embodiments of this application, the portable device may be divided into function modules. For example, each function module may be obtained through division corresponding to each function, or two or more functions may be integrated into one processing module. The foregoing integrated module may be implemented in a form of hardware, or may be implemented in a form of a software function module. It should be noted that module division in embodiments of this application is an example, and is merely logical function division. In actual implementation, there may be another division manner.

When the software is used for implementation, all or some of the foregoing embodiments may be implemented in a form of a computer program product. The computer program product includes one or more computer instructions. When the computer program instruction is loaded and executed on a computer, all or some of the procedures or the functions described in embodiments of this application are generated. The computer may be a general-purpose computer, a dedicated computer, a computer network, or another programmable apparatus. The computer instructions may be stored in a computer-readable storage medium, or transmitted from one computer-readable storage medium to another computer-readable storage medium, for example, transmitted from one website site, computer, server, or data center to another website site, computer, server, or data center in a wired (for example, coaxial cable, optical fiber, or digital subscriber line) manner or a wireless (for example, infrared, wireless, or microwave) manner. The computer-readable storage medium may be any available medium accessible by a computer or a data storage device such as a server or a data center integrating one or more available media. The available medium may be a magnetic medium (for example, a floppy disk, a hard disk, a magnetic tape), an optical medium (for example, a DVD), or a semiconductor medium (for example, a solid-state drive).

A person of ordinary skill in the art may understand that all or some of the procedures in the methods in the foregoing embodiments are implemented. The procedure may be completed by a computer program instructing related hardware. The program may be stored in a computer-readable storage medium. When the program is executed, the procedure in the foregoing method embodiments may be included. The foregoing storage medium includes any medium that can store program code, such as a ROM or a random access memory RAM, a magnetic disk, or an optical disc.

What is claimed is:

1. An electronic device, comprising a display, one or more processors, and one or more memories, wherein the one or more processors are configured to:
   when a brightness of a touch screen of the electronic device is greater than a first threshold, and a hardware refresh rate of the electronic device is a second refresh rate, and a software scanning rate of the electronic device is the second refresh rate, receive a first touch operation of the touch screen of the electronic device from a user;
   switch the hardware refresh rate from the second refresh rate to the first refresh rate, and switch the software refresh rate from the second refresh rate to the first refresh rate a refresh rate, in response to the first touch operation, wherein the first refresh rate is greater than the second refresh rate; and
   when the brightness of the touch screen of the electronic device is less than or equal to the first threshold, and the software refresh rate is the first refresh rate, and the hardware refresh rate is the first refresh rate, adjust the software refresh rate from the first refresh rate to the second refresh rate, in response to no detection of the user's touch operation on the touch screen of the electronic device within a first period of time, wherein the hardware refresh rate is still maintaining at said first refresh rate;
   wherein, the hardware refresh rate is a refresh rate of a touch screen of the electronic device, and the software refresh rate is a frequency at which a system synthesizer of the electronic device synthesizes image data.

2. The electronic device according to claim 1, wherein the one or more processors are further configured to:
   in a case that the brightness of the touch screen of the electronic device is less than or equal to the first threshold, receive a second touch operation of the touch screen of the electronic device after adjusting the software refresh rate from the first refresh rate to the second refresh rate;
   switch the software refresh rate from the second refresh rate to the first refresh rate, in response to the second touch operation.

3. The electronic device according to claim 1, wherein the one or more processors are further configured to:
   when the brightness of the touch screen of the electronic device is greater than the first threshold, the software refresh rate is the first refresh rate, and the hardware refresh rate is the first refresh rate, switch the hardware refresh rate from the first refresh rate to the second refresh rate, and change the software refresh rate from the first refresh rate to the second refresh rate, in response to no detection of the user's touch operation on the touch screen of the electronic device within a second period of time.

4. The electronic device according to claim 1, wherein the second refresh rate is 1/N of the first refresh rate, wherein N is a positive integer greater than 1.

5. An electronic device, comprising a display, one or more processors, and one or more memories, wherein the one or more processors are configured to:
   when an ambient light brightness detected by the electronic device is greater than a first threshold, and a hardware refresh rate of the electronic device is a first refresh rate, and a software refresh rate of the electronic device is the first refresh rate, switch the hardware refresh rate from the first refresh rate to a second refresh rate, and switch the software refresh rate from the first refresh rate to the second refresh rate, in response to that no touch operation by the user on the touch screen of the electronic device is detected within a period of time, wherein the first refresh rate greater than the second refresh rate;
   when the hardware refresh rate is the second refresh rate and the software refresh rate is the second refresh rate, switch the hardware refresh from the second refresh rate to the first refresh rate, wherein the hardware refresh rate remains at the first refresh rate in response to the ambient light brightness detected by the electronic device being less than or equal to the first threshold, and the software refresh rate remains at the second refresh rate;
   wherein, the hardware refresh rate is a refresh rate of a touch screen of the electronic device, and the software refresh rate is a frequency at which a system synthesizer of the electronic device synthesizes image data.

6. The electronic device according to claim 5, wherein the one or more processors are further configured to:
when the ambient light brightness detected by the electronic device is less than or equal to the first threshold, and the software refresh rate is the second refresh rate, receive a first touch operation by the user on the touch screen of the electronic device;
switch the software refresh rate from the second refresh rate to the first refresh rate, in response to the first touch operation.

7. The electronic device according to claim 6, wherein the one or more processors are further configured to:
when the ambient light brightness detected by the electronic device is less than or equal to the first threshold, and the software refresh rate is the first refresh rate, switch the software refresh rate from the first refresh rate to the second refresh rate by the user's touch operation on the touch screen of the electronic device, in response to the electronic device not detecting any touch operation within a second duration.

8. The electronic device according to claim 5, wherein the one or more processors are further configured to:
when the ambient light brightness detected by the electronic device is greater than the first threshold, and the hardware refresh rate is the second refresh rate, and the software refresh rate is the second refresh rate, receive the second touch operation of the touch screen;
switch the hardware refresh rate from the second refresh rate to the first refresh rate and switch the software refresh rate from the second refresh rate to the first refresh rate, in response to the second touch operation.

9. The electronic device according to claim 5, wherein the second refresh rate is 1/N of the first refresh rate, wherein N is a positive integer greater than 1.

10. An electronic device, comprising a display, one or more processors, and one or more memories, wherein the one or more processors are configured to:
when a brightness of a touch screen of the electronic device is greater than a first threshold, and a hardware refresh rate of the electronic device is a first refresh rate, and a software refresh rate of the electronic device is the first refresh rate, receive a first touch operation of the touch screen;
start a first application or switch to the first application in response to the first touch operation;
switch the hardware refresh rate of the electronic device from the first refresh rate to a second refresh rate, and switch the software refresh rate of the electronic device from the first refresh rate to a second refresh rate, in response to the first touch operation, wherein the first refresh rate is greater than the second refresh rate;
when the brightness of the touch screen of the electronic device is less than or equal to the first threshold, and the hardware refresh rate of the electronic device is the first refresh rate, and the software refresh rate is the first refresh rate, receive a user a second touch operation on the touch screen of the electronic device;
start the first application or switch to the first application in response to the second touch operation;
switch the software refresh rate of the electronic device from the first refresh rate to a second refresh rate in response to the second touch operation, wherein the hardware refresh rate remains at the first refresh rate;
wherein, the hardware refresh rate is a refresh rate of a touch screen of the electronic device, and the software refresh rate is a frequency at which a system synthesizer of the electronic device synthesizes image data.

11. The electronic device according to claim 10, wherein the one or more processors are further configured to:
when the brightness of the touch screen of the electronic device is greater than the first threshold, and the hardware refresh rate of the electronic device is the first refresh rate, and the software refresh rate of the electronic device is the first refresh rate, receive the third touch operation of the touch screen of the electronic device;
in response to the third touch operation, start a second application or switch to the second application, wherein the hardware refresh rate remains at the first refresh rate, and the software refresh rate remains at the first refresh rate;
in a case that the brightness of the touch screen of the electronic device is greater than the first threshold, after the third touch operation ends, in response to the electronic device not detecting any touch operation within the first duration of the touch screen, switch the hardware refresh rate from the first refresh rate to a second refresh rate, and switch the software refresh rate from the first refresh rate to the second refresh rate;
when the brightness of the touch screen of the electronic device is less than or equal to the first threshold, and the hardware refresh rate of the electronic device is the first refresh rate, and the software refresh rate is the first refresh rate, receive a fourth touch operation on the touch screen of the electronic device from the user;
in response to the fourth touch operation, start the second application or switch to the second application, wherein the hardware refresh rate remains at the first refresh rate, and the software refresh rate remains at the first refresh rate;
when the brightness of the touch screen of the electronic device is less than or equal to the first threshold, after the fourth touch operation, in response to the electronic device not detecting any touch operation on the touch screen of the electronic device within a second time period, switch the software refresh rate from the first refresh rate to the second refresh rate, wherein the hardware refresh rate remains at the first refresh rate.

12. The electronic device according to claim 10, wherein the first application is a social application.

13. The electronic device according to claim 12, wherein the second application is a game application.

14. The electronic device according to claim 10, wherein the second refresh rate is 1/N of the first refresh rate, wherein N is a positive integer greater than 1.

* * * * *

UNITED STATES PATENT AND TRADEMARK OFFICE
CERTIFICATE OF CORRECTION

| | | |
|---|---|---|
| PATENT NO. | : 12,020,620 B2 | Page 1 of 1 |
| APPLICATION NO. | : 18/249625 | |
| DATED | : June 25, 2024 | |
| INVENTOR(S) | : Lifeng Cai et al. | |

It is certified that error appears in the above-identified patent and that said Letters Patent is hereby corrected as shown below:

On the Title Page

In item (71), in Column 1, in "Applicant", Line 1, delete "Guangdong" and insert -- Shenzhen --.

Signed and Sealed this
First Day of October, 2024

Katherine Kelly Vidal
*Director of the United States Patent and Trademark Office*